(12) United States Patent
Hsieh et al.

(10) Patent No.: US 8,441,746 B2
(45) Date of Patent: May 14, 2013

(54) WIDE ANGLE PHOTOGRAPHIC LENS ASSEMBLY

(75) Inventors: Dung-Yi Hsieh, Taichung (TW);
Ming-Ta Chou, Taichung (TW);
Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 177 days.

(21) Appl. No.: 13/169,955

(22) Filed: Jun. 27, 2011

(65) Prior Publication Data

US 2012/0206822 A1    Aug. 16, 2012

(30) Foreign Application Priority Data

Feb. 16, 2011    (TW) .............................. 100105158 A

(51) Int. Cl.
*G02B 13/04*    (2006.01)
(52) U.S. Cl.
USPC .......................... 359/753; 359/708; 359/713
(58) Field of Classification Search .................. 359/708, 359/649–651, 680, 682, 714–717, 753
See application file for complete search history.

(56) References Cited

U.S. PATENT DOCUMENTS

| | | | |
|---|---|---|---|
| 7,446,955 B1 | 11/2008 | Noda | |
| 2008/0204902 A1* | 8/2008 | Obu et al. | 359/770 |
| 2009/0195884 A1* | 8/2009 | Inoko | 359/682 |
| 2011/0002044 A1* | 1/2011 | Inoko | 359/682 |

* cited by examiner

*Primary Examiner* — James R Greece
*Assistant Examiner* — Sharrief Broome
(74) *Attorney, Agent, or Firm* — Morris Manning & Martin LLP; Tim Tingkang Xia, Esq.

(57) ABSTRACT

A wide angle photographic lens assembly comprises, in order from an object side to an image side, a first lens element with negative refractive power having a convex object-side surface and a concave image-side surface, a second lens element with positive refractive power having a concave object-side surface and a convex image-side surface, a third lens element, a fourth lens element with positive refractive power, a fifth lens element with negative refractive power, and a sixth lens element with positive refractive power. By adjusting the conditions among the above-mentioned lens elements, the wide angle photographic lens assembly can provide a wide-field of view and correct the aberration in order to obtain superior imaging quality.

25 Claims, 14 Drawing Sheets

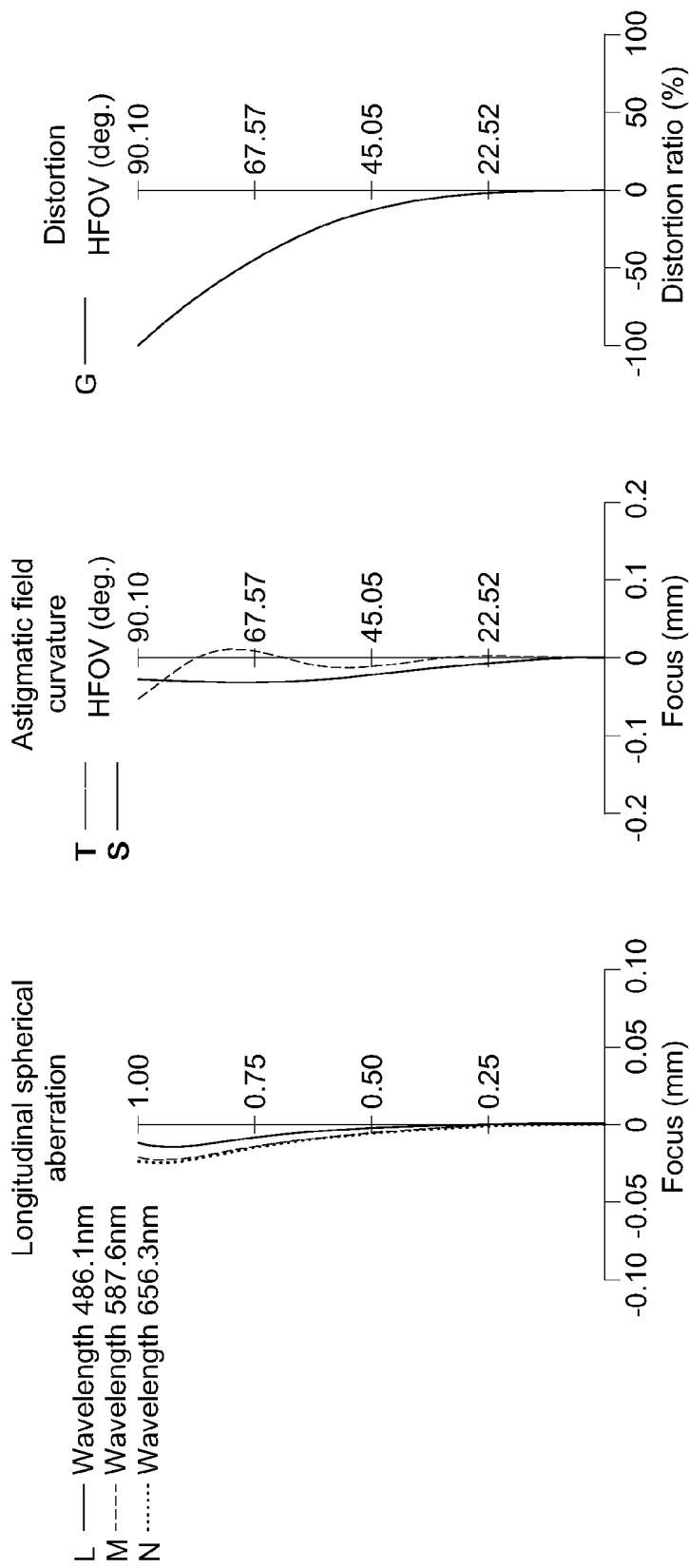

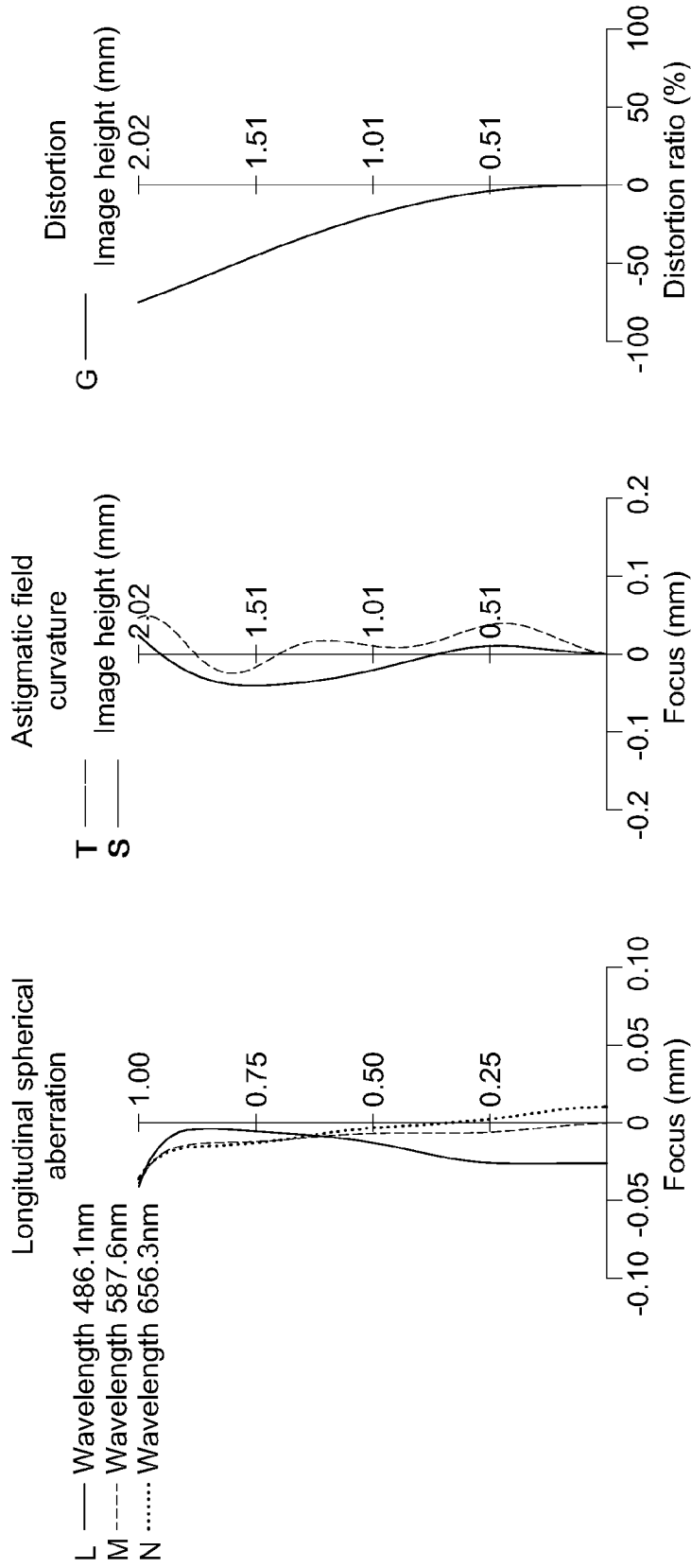

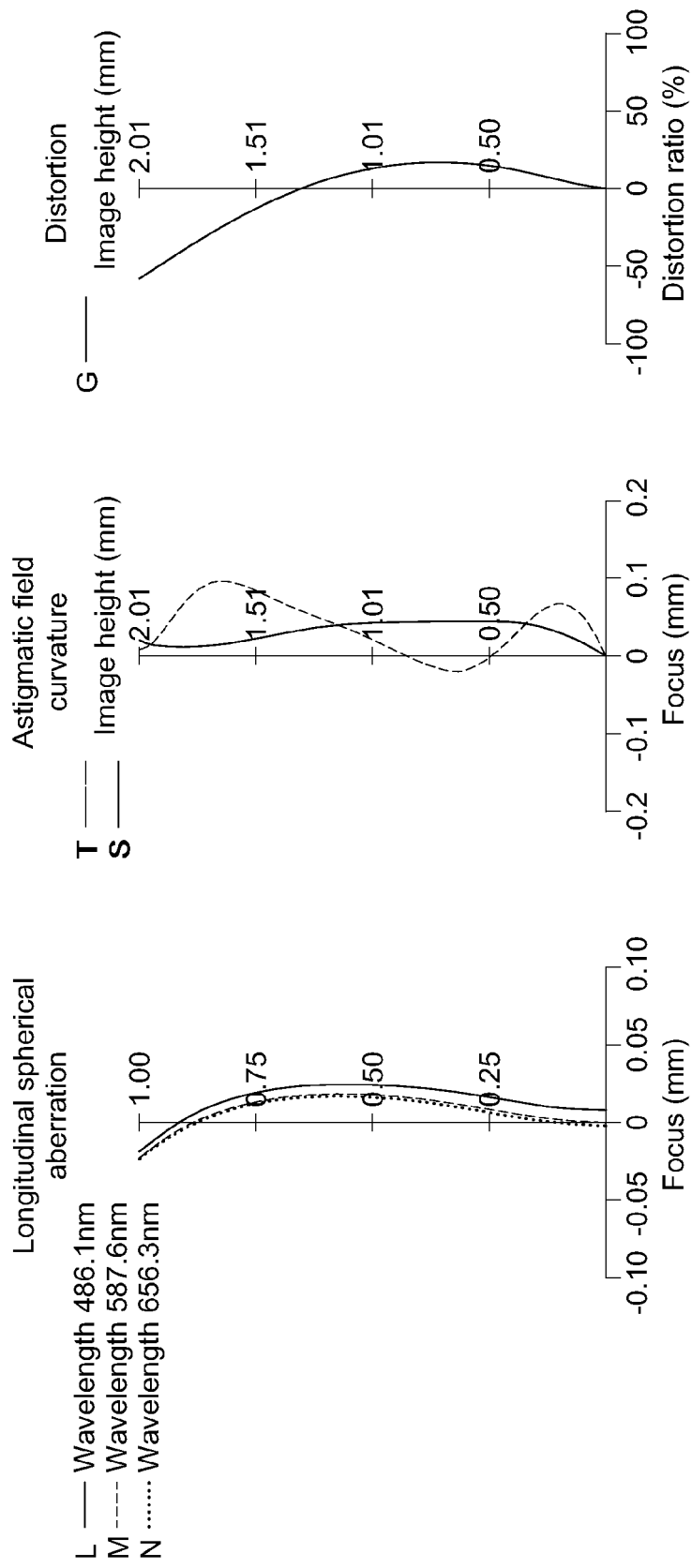

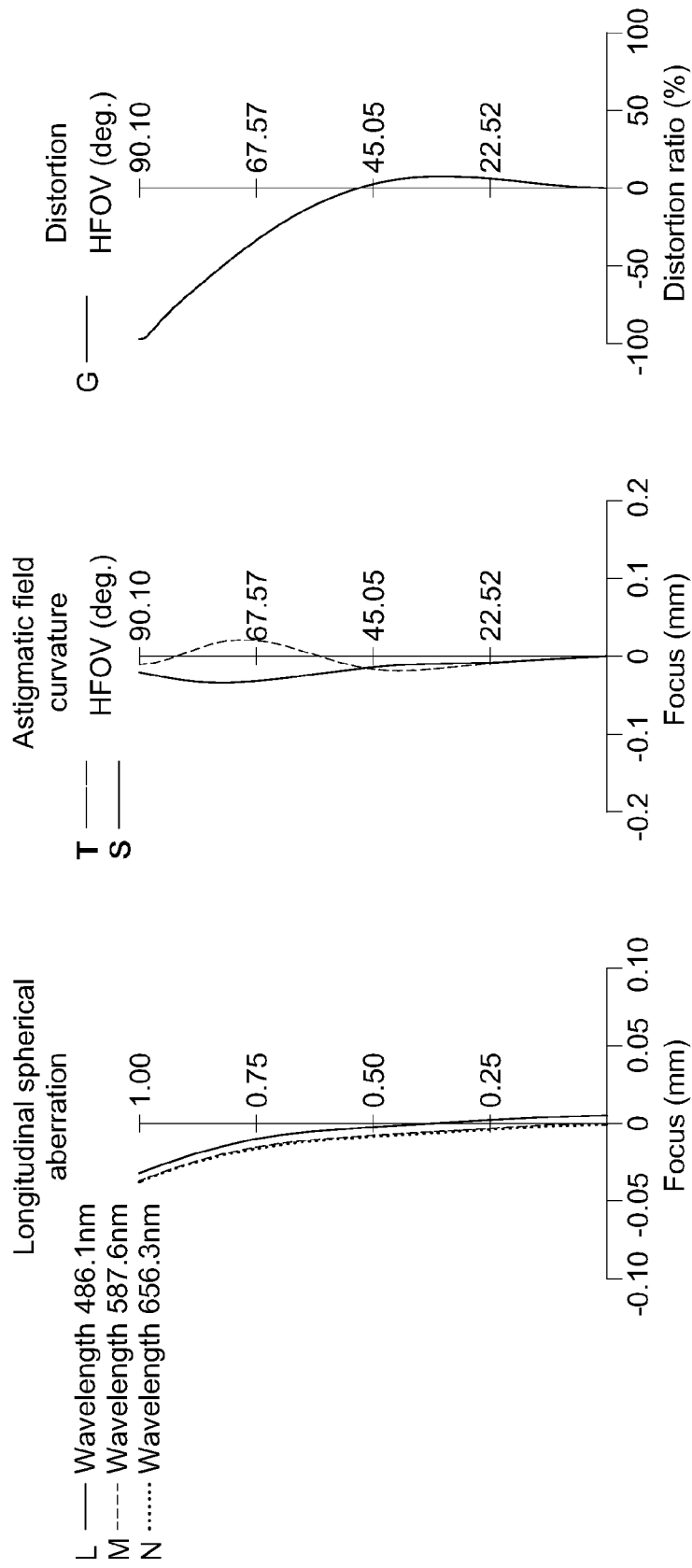

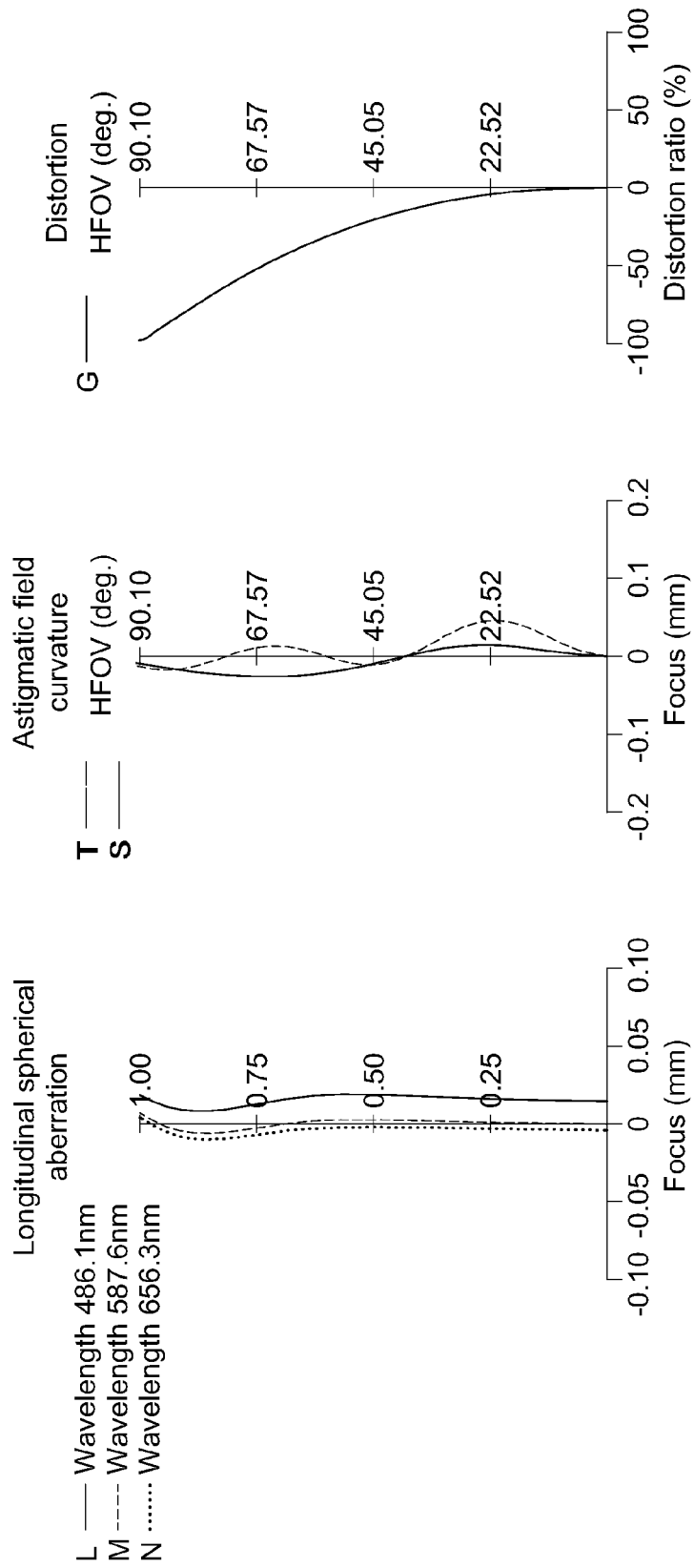

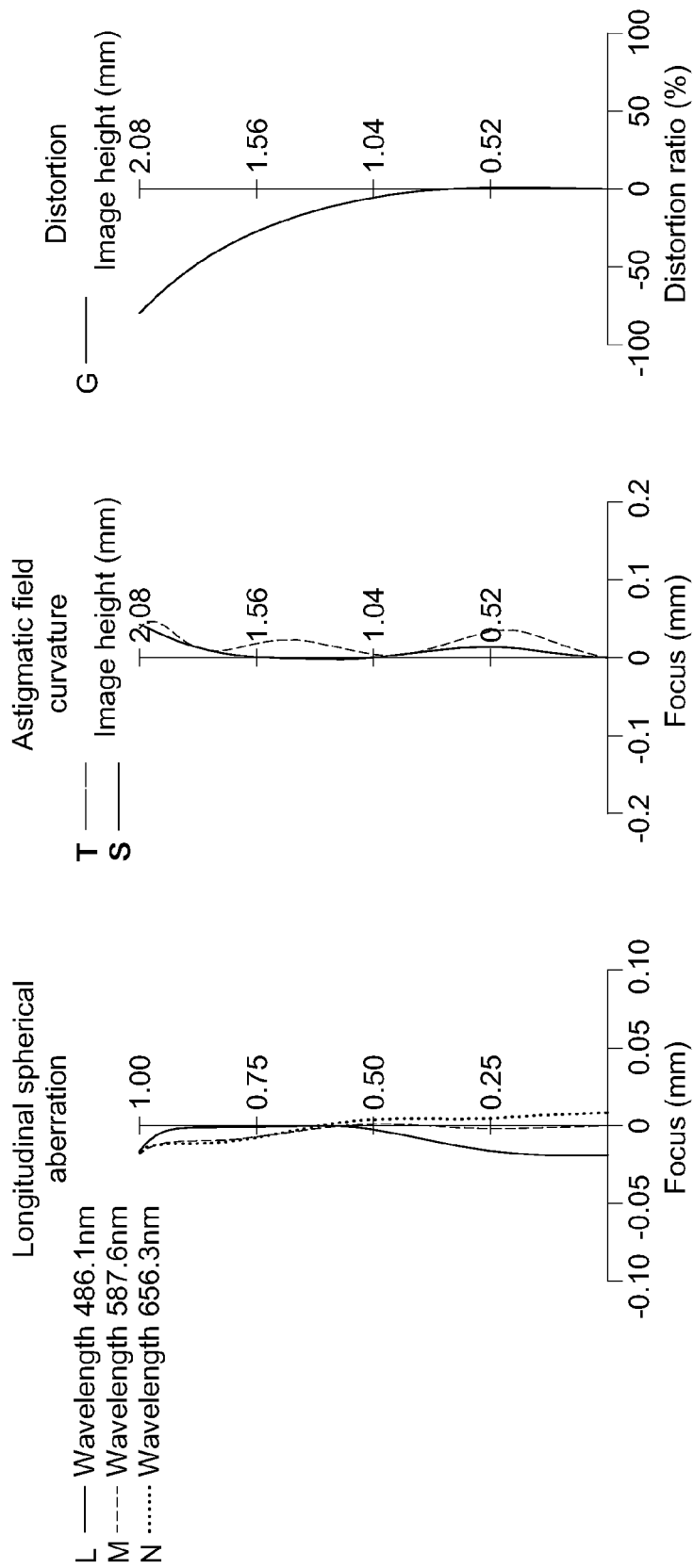

WIDE ANGLE PHOTOGRAPHIC LENS ASSEMBLY

CROSS-REFERENCE TO RELATED APPLICATIONS

This non-provisional application claims priority under 35 U.S.C. §119(a) on Patent Application No(s). 100105158 filed in Taiwan, R.O.C. on Feb. 16, 2011, the entire contents of which are hereby incorporated by reference.

BACKGROUND

1. Technical Field

The present disclosure relates to a photographic lens assembly, and more particularly to a miniaturized wide angle photographic lens assembly with a wide-field of view.

2. Related Art

In recent years, the use of photographic lens assembly is widespread, especially in mobile phone, webcam, car, surveillance camera and electronic entertainment industry. The photo-sensing device, e.g. a sensor, of an ordinary photographic lens assembly is commonly selected from a charge coupled device (CCD) and a complementary metal-oxide semiconductor (CMOS). In addition, as the semiconductor manufacturing technology enables the sensors with miniaturized pixels, the development of the photographic lens assemblies is heading toward producing high resolution image and getting compact. Therefore, researches on miniaturized photographic lens assembly which is capable of forming high quality images on a miniaturized image sensor have been vigorously conducted.

In general, in the car, surveillance camera and electronic entertainment industry, the photographic lens assembly having wide field of view is needed in order to obtain a larger view in a single frame. To obtain a wide field of view, there is a so-called inverse telephoto photographic lens assembly consisting of a front lens group with negative refractive power and a rear lens group with positive refractive power. For example, U.S. Pat. No. 7,446,955 discloses a four-lens photographic lens assembly consisting of a front lens group with negative refractive power and a rear lens group with positive refractive power. Although having a wide field of view, the four-lens photographic lens assembly is bad in aberration correction since the rear lens group has only one lens. In addition, since the car equipped with image sensor used for parking gradually gains in popularity, there has been a trend toward the high resolution photographic lens assembly with wide field of view and short length.

SUMMARY

According to an embodiment of the present disclosure, a wide angle photographic lens assembly comprises, in order from an object side to an image side: a first lens element with negative refractive power having a convex object-side surface and a concave image-side surface, a second lens element with positive refractive power having a concave object-side surface and a convex image-side surface, a third lens element, a fourth lens element with positive refractive power, a fifth lens element with negative refractive power, and a sixth lens element with positive refractive power.

The focal length of the wide angle photographic lens assembly is f, the focal length of the second lens element is $f_2$, and the focal length of the sixth lens element is $f_6$. The wide angle photographic lens assembly satisfies following conditions:

$0<f/f_2<1.0$   (Condition 1)

$0.35<f/f_6<0.95$   (Condition 2)

According to another embodiment of the present disclosure, a wide angle photographic lens assembly comprises, in order from an object side to an image side: a front lens group, a stop, and a rear lens group. The front lens group comprises a first lens element with negative refractive power having a convex object-side surface and a concave image-side surface and a second lens element with positive refractive power having a concave object-side surface and a convex image-side surface. The rear lens group comprises a third lens element, a fourth lens element with positive refractive power, a fifth lens element with negative refractive power, and a sixth lens element with positive refractive power.

The axial distance between the image-side surface of the second lens element and the stop is Dr4S, the axial distance between the first lens element and the second lens element is $T_{12}$, the focal length of the wide angle photographic lens assembly is f, and the overall focal length of the front lens group is $f_{12}$. The wide angle photographic lens assembly satisfies following conditions:

$Dr4S/T_{12}<0.4$   (Condition 3)

$0<f/f_{12}<1.2$   (Condition 4)

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 1B is a schematic view of longitudinal spherical aberration curves when the lights having wavelengths of 486.1 nm, 587.6 nm, and 656.3 nm are respectively projected in the wide angle photographic lens assembly in FIG. 1A;

FIG. 1C is a schematic view of astigmatic field curves when the light having the wavelength of 587.6 nm is projected in the wide angle photographic lens assembly in FIG. 1A;

FIG. 1D is a schematic view of a distortion curve when the light having the wavelength of 587.6 nm is projected in the wide angle photographic lens assembly in FIG. 1A;

FIG. 2B is a schematic view of longitudinal spherical aberration curves when the lights having wavelengths of 486.1 nm, 587.6 nm, and 656.3 nm are respectively projected in the wide angle photographic lens assembly in FIG. 2A;

FIG. 2C is a schematic view of astigmatic field curves when the light having the wavelength of 587.6 nm is projected in the wide angle photographic lens assembly in FIG. 2A;

FIG. 2D is a schematic view of a distortion curve when the light having the wavelength of 587.6 nm is projected in the wide angle photographic lens assembly;

Figure 3A:
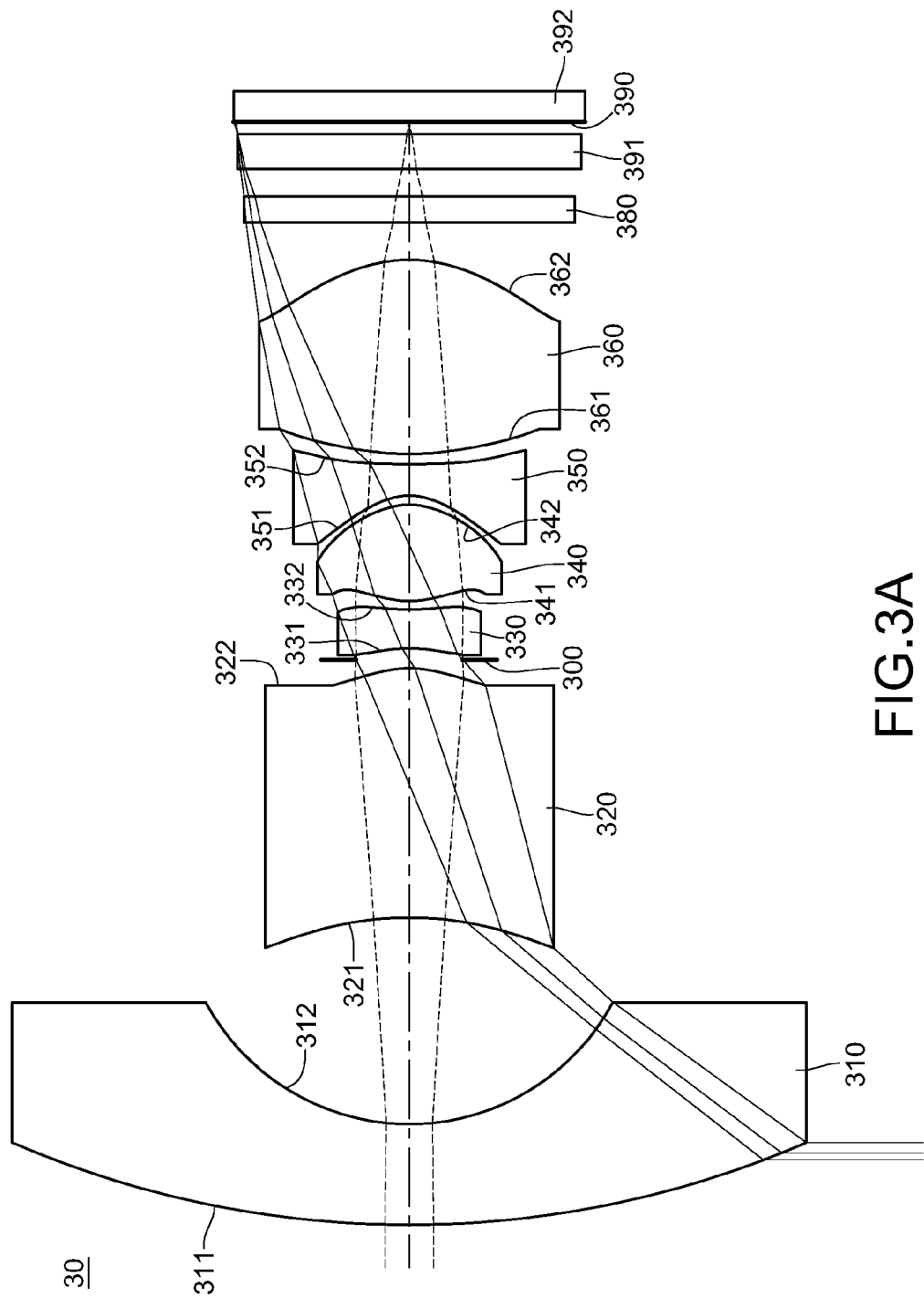
FIG. 3A is a schematic structural view of a third embodiment of a wide angle photographic lens assembly according to the present disclosure.
Figures 3B, 3C, 3D:
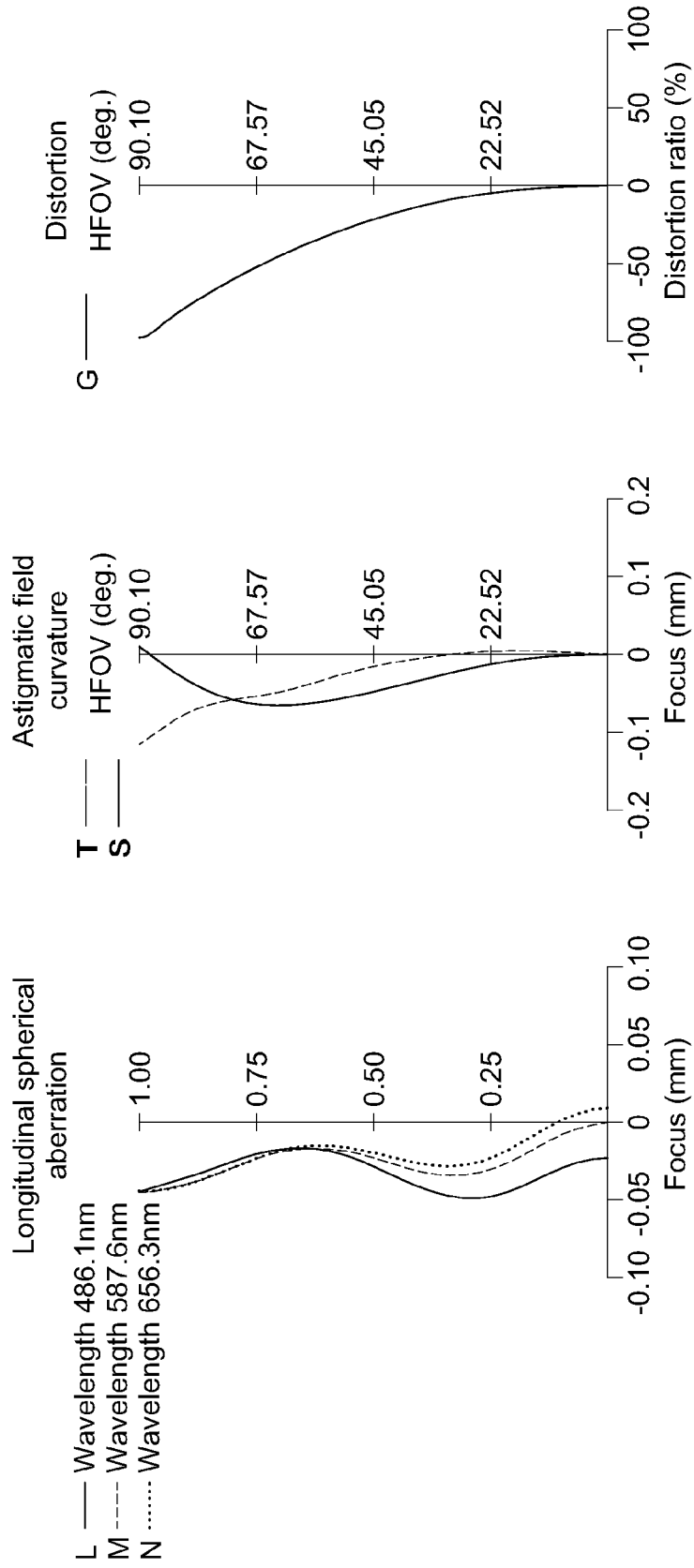
FIG. 3B is a schematic view of longitudinal spherical aberration curves when the lights having wavelengths of 486.1 nm, 587.6 nm, and 656.3 nm are respectively projected in the wide angle photographic lens assembly in FIG. 3A.
Figure 4A:
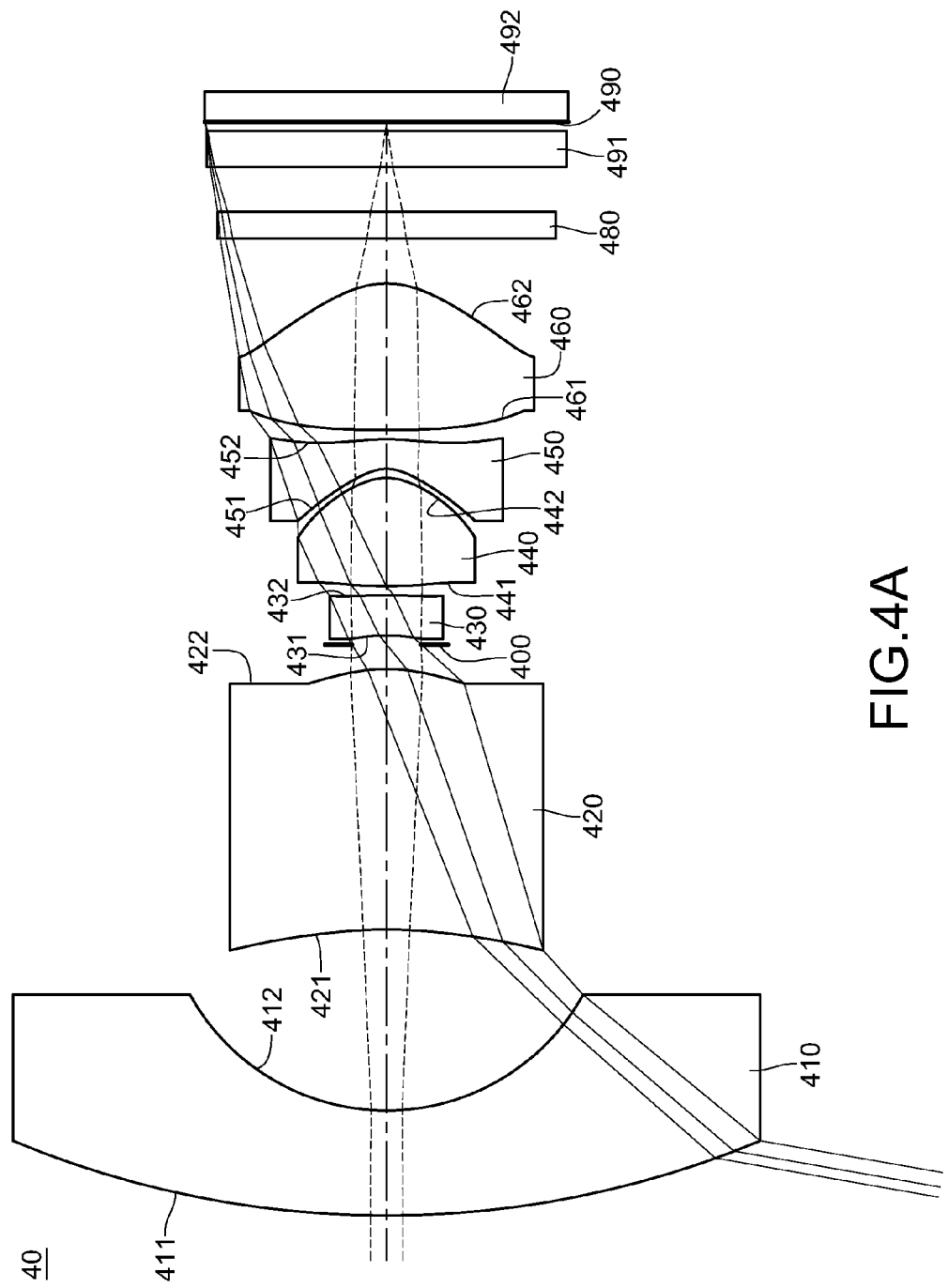
Figure 5A:
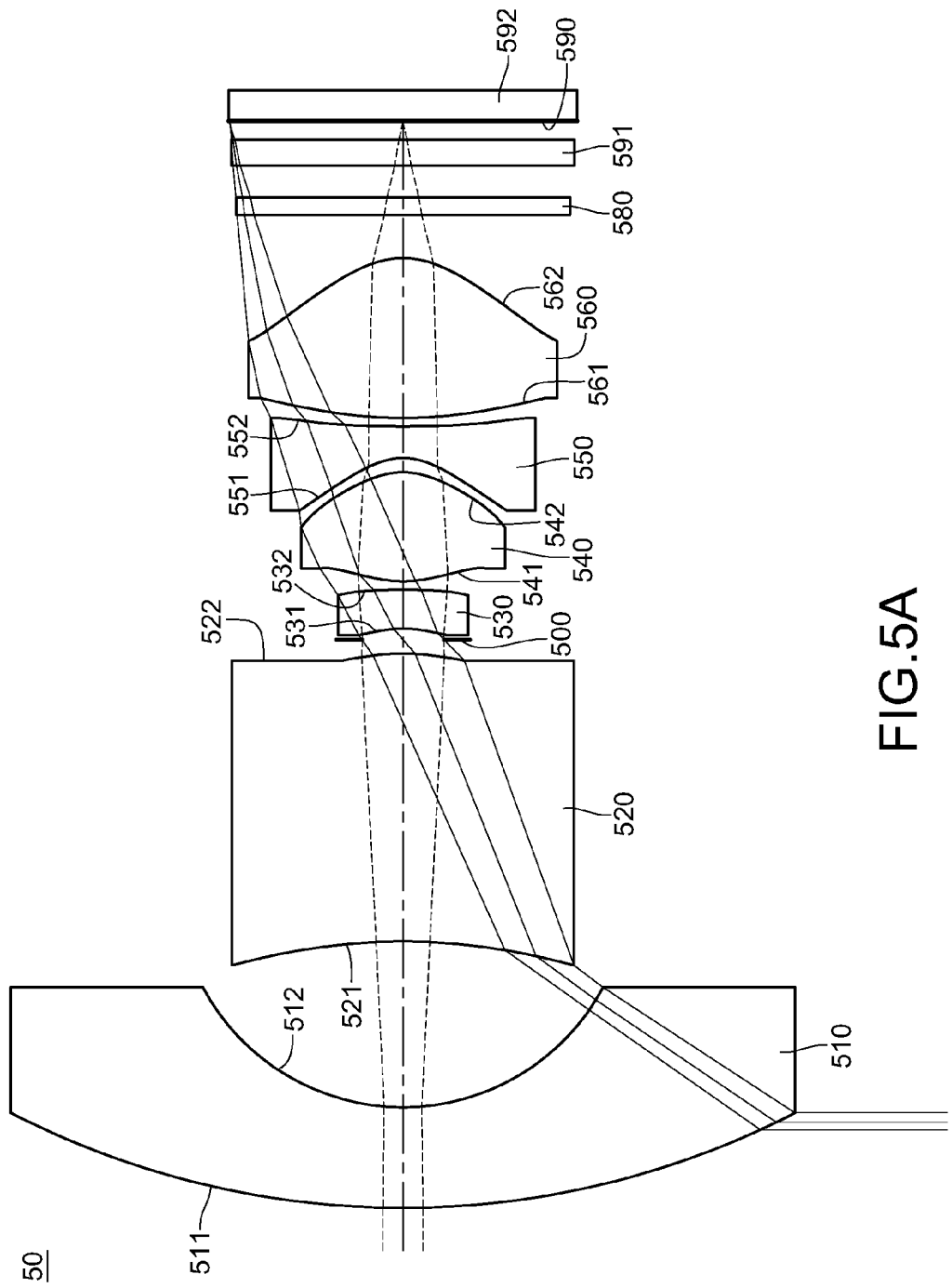
Figure 6A:
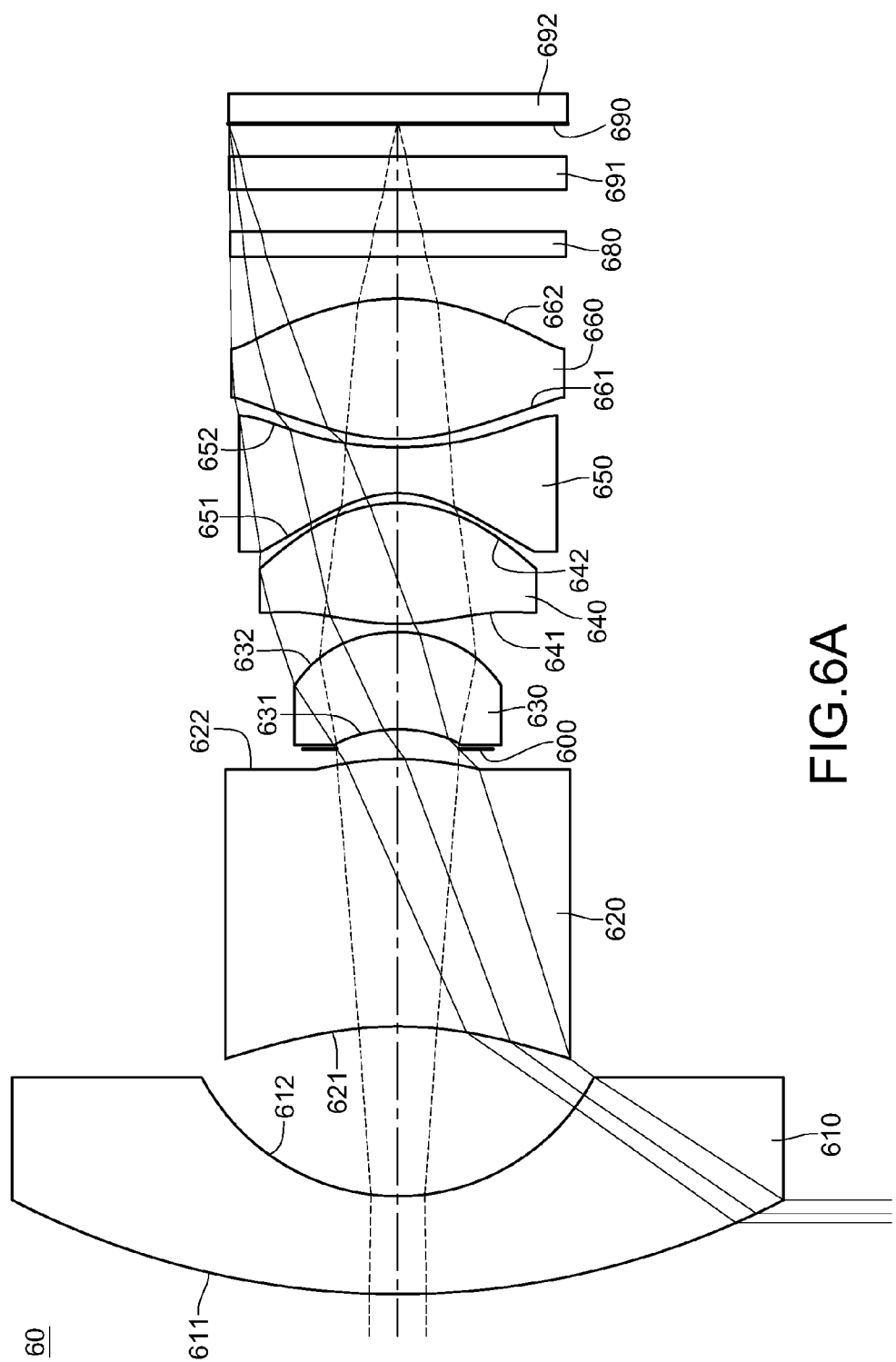
Figure 7A:
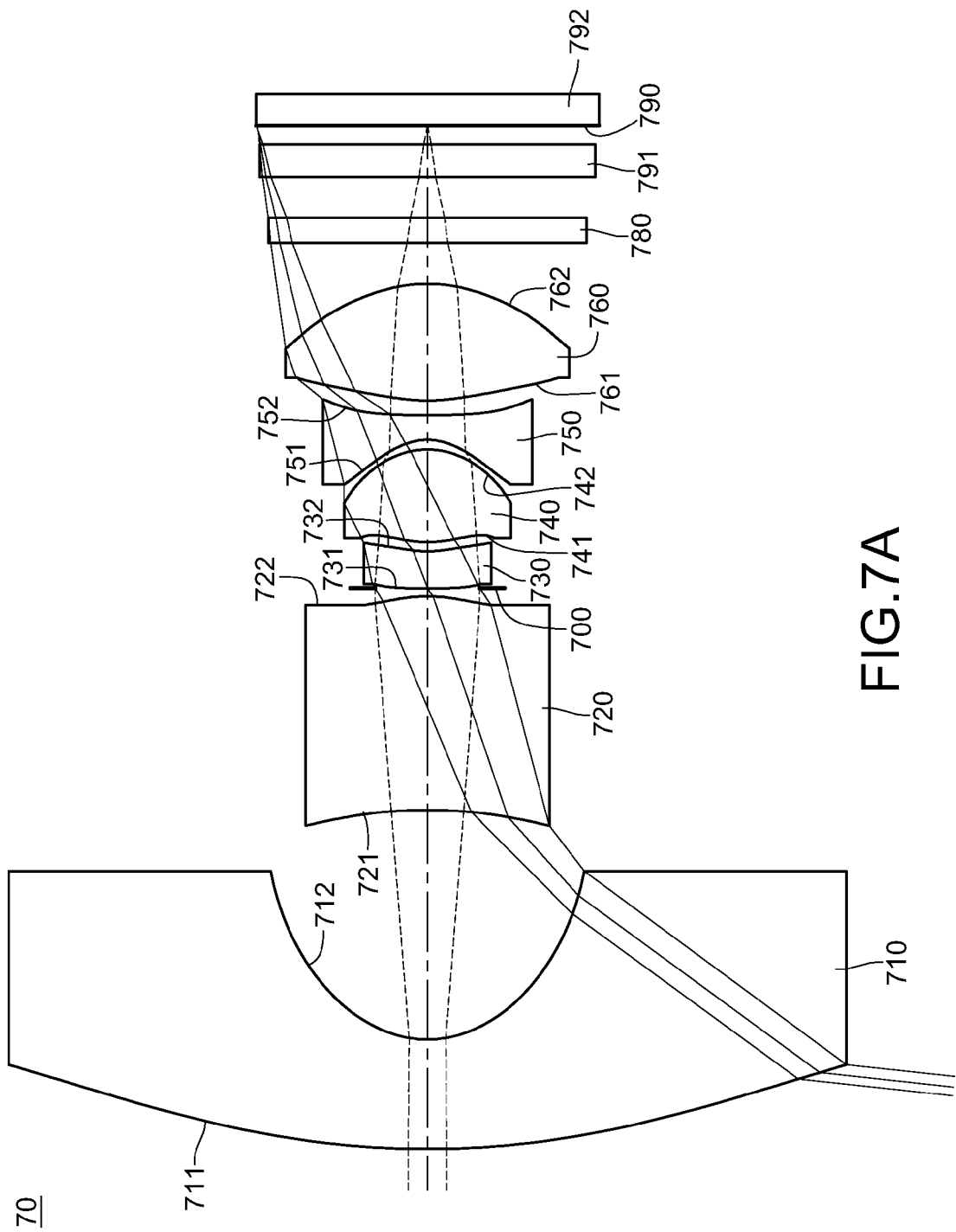

FIG. 3C is a schematic view of astigmatic field curves when the light having the wavelength of 587.6 nm is projected in the wide angle photographic lens assembly in FIG. 3A;

FIG. 3D is a schematic view of a distortion curve when the light having the wavelength of 587.6 nm is projected in the wide angle photographic lens assembly in FIG. 3A;

FIG. 4A is a schematic structural view of a fourth embodiment of a wide angle photographic lens assembly according to the present disclosure;

FIG. 4B is a schematic view of longitudinal spherical aberration curves when the lights having wavelengths of 486.1 nm, 587.6 nm, and 656.3 nm are respectively projected in the wide angle photographic lens assembly in FIG. 4A;

FIG. 4C is a schematic view of astigmatic field curves when the light having the wavelength of 587.6 nm is projected in the wide angle photographic lens assembly in FIG. 4A;

FIG. 4D is a schematic view of a distortion curve when the light having the wavelength of 587.6 nm is projected in the wide angle photographic lens assembly in FIG. 4A;

FIG. 5A is a schematic structural view of a fifth embodiment of a wide angle photographic lens assembly according to the present disclosure;

FIG. 5B is a schematic view of longitudinal spherical aberration curves when the lights having wavelengths of 486.1 nm, 587.6 nm, and 656.3 nm are respectively projected in the wide angle photographic lens assembly in FIG. 5A;

FIG. 5C is a schematic view of astigmatic field curves when the light having the wavelength of 587.6 nm is projected in the wide angle photographic lens assembly in FIG. 5A;

FIG. 5D is a schematic view of a distortion curve when the light having the wavelength of 587.6 nm is projected in the wide angle photographic lens assembly in FIG. 5A;

FIG. 6A is a schematic structural view of a sixth embodiment of a wide angle photographic lens assembly according to the present disclosure;

FIG. 6B is a schematic view of longitudinal spherical aberration curves when the lights having wavelengths of 486.1 nm, 587.6 nm, and 656.3 nm are respectively projected in the wide angle photographic lens assembly in FIG. 6A;

FIG. 6C is a schematic view of astigmatic field curves when the light having the wavelength of 587.6 nm is projected in the wide angle photographic lens assembly in FIG. 6A;

FIG. 6D is a schematic view of a distortion curve when the light having the wavelength of 587.6 nm is projected in the wide angle photographic lens assembly in FIG. 6A;

FIG. 7A is a schematic structural view of a seventh embodiment of a wide angle photographic lens assembly according to the present disclosure;

FIG. 7B is a schematic view of longitudinal spherical aberration curves when the lights having wavelengths of 486.1 nm, 587.6 nm, and 656.3 nm are respectively projected in the wide angle photographic lens assembly in FIG. 7A;

FIG. 7C is a schematic view of astigmatic field curves when the light having the wavelength of 587.6 nm is projected in the wide angle photographic lens assembly in FIG. 7A; and FIG. 7D is a schematic view of a distortion curve when the light having the wavelength of 587.6 nm is projected in the wide angle photographic lens assembly in FIG. 7A.

DETAILED DESCRIPTION

Figure 1A:
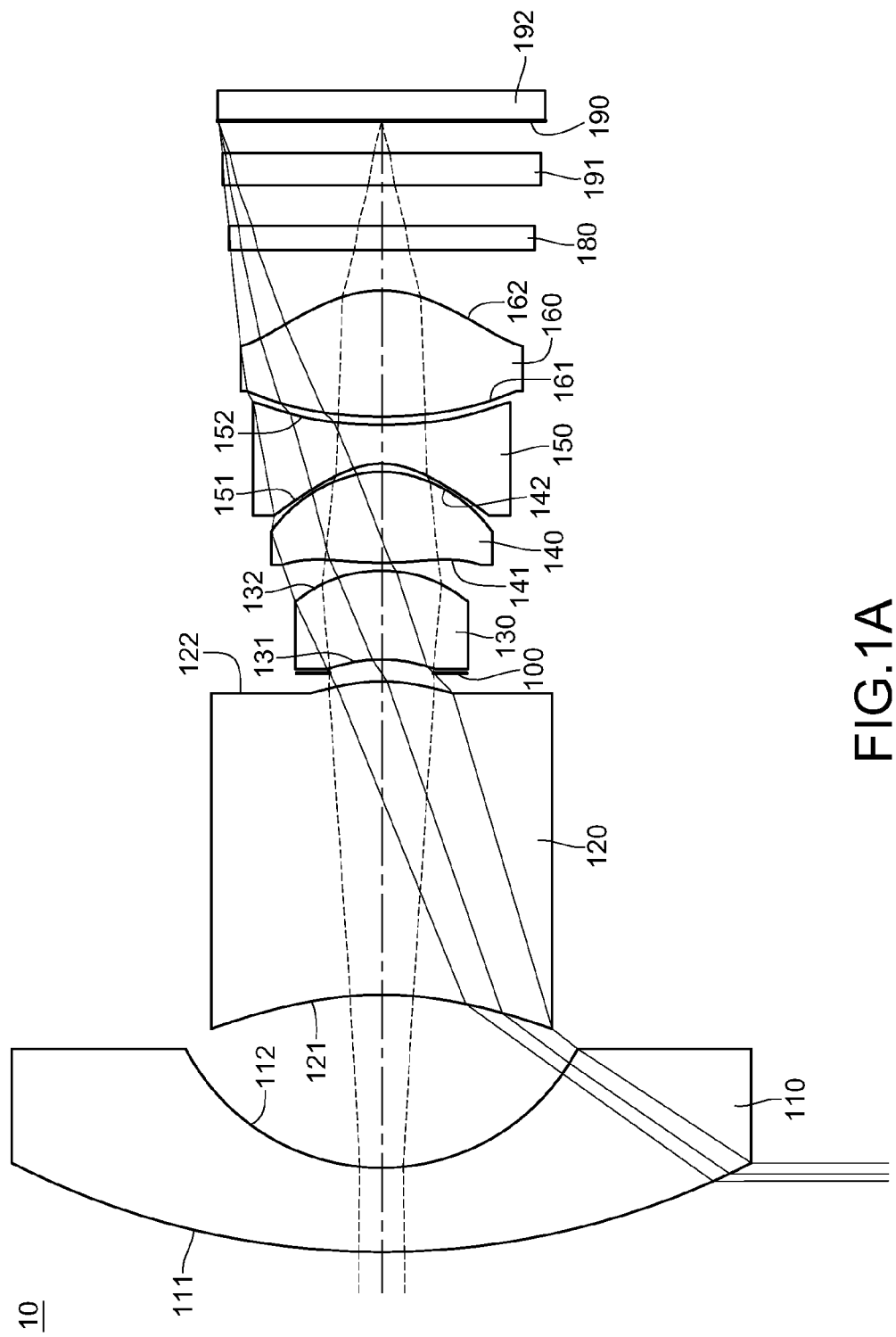
FIG. 1A is a schematic structural view of a first embodiment of a wide angle photographic lens assembly according to the present disclosure.

One of the embodiments of the wide angle photographic lens assemblies of the present disclosure is described with FIG. 1A as an example to illustrate the lens combinations, the configuration relationships and the conditions of the wide angle photographic lens assemblies that are commonly disclosed by the embodiments of the disclosure. The differences between the embodiments will be described in detail in embodiments other than the embodiment described in FIG. 1.

Taking FIG. 1A as an example, the wide angle photographic lens assembly 10 comprises, from an object side to an image side along an optical axis, i.e. from left to right in FIG. 1A, in sequence, a first lens element 110, a second lens element 120, a third lens element 130, a fourth lens element 140, a fifth lens element 150, a sixth lens element 160.

The first lens element 110 with negative refractive power comprises a convex object-side surface 111 and a concave image-side surface 112. The first lens element 110 is made of glass, and the object-side surface 111 and the image-side surface 112 are spheric.

The second lens element 120 with positive refractive power comprises a concave object-side surface 121 and a convex image-side surface 122. The second lens element 120 is made of plastic. The object-side surface 121 and the image-side surface 122 are aspheric.

The third lens element 130 made of plastic comprises an object-side surface 131 and an image-side surface 132. The object-side surface 131 and the image-side surface 132 are aspheric. When being positive, the refractive power of the third lens element 130 is favorable to shorten the total optical length of the wide angle photographic lens assembly 10. When being negative, the refractive power of the third lens element 130 is favorable to correct the aberration of the wide angle photographic lens assembly 10.

The fourth lens element 140 with positive refractive power includes an object-side surface 141 and a convex image-side surface 142. The fourth lens element 140 is made of plastic, and the object-side surface 141 and the image-side surface 142 are aspheric.

The fifth lens element 150 with negative refractive power comprises a concave object-side surface 151 and an image-side surface 152. The fifth lens element 150 is made of plastic, and the object-side surface 151 and the image-side surface 152 are aspheric.

The sixth lens element 160 with positive refractive power comprises an object-side surface 161 and a convex image-side surface 162. The sixth lens element 160 is made of plastic, and object-side surface 161 and the image-side surface 162 are aspheric.

It is favorable to shorten the total length of wide angle photographic lens assembly 10 when at least one of the third lens element 130, the fourth lens element 140 and the sixth lens element 160 is bi-convex.

Moreover, the wide angle photographic lens assembly 10 further comprises an aperture stop 100 which is, for example, disposed between the second lens element 120 and the third lens element 130 to control the image brightness of the wide angle photographic lens assembly 10. In addition, the wide angle photographic lens assembly 10 comprises, in the right side of the sixth lens element 160 along the optical axis in sequence, an infrared filter 180, a protective glass 191 and an image sensor 192 having an image plane 190 facing the protective glass 191.

The wide angle photographic lens assembly 10 of the present disclosure satisfies the following conditions:

$$0 < f/f_2 < 1.0 \quad \text{(Condition 1)}$$

$$0.35 < f/f_6 < 0.95 \quad \text{(Condition 2)}$$

$$Dr4S/T_{12} < 0.4 \quad \text{(Condition 3)}$$

$$0 < f/f_{12} < 1.2 \quad \text{(Condition 4)}$$

The focal length of the wide angle photographic lens assembly 10 is f, the focal length of the second lens element 120 is $f_2$, the focal length of the sixth lens element 160 is $f_6$, the axial distance between the image-side surface 122 and the aperture stop 100 is Dr4S, the axial distance between the first lens element 110 and the second lens element 120 is $T_{12}$, and the overall focal length of the front lens group which comprises the first lens element 110 and the second lens element 120 is $f_{12}$.

In the wide angle photographic lens assembly 10, the negative refractive power of the first lens element 110 is favorable to expand the field of view of the wide angle photographic lens assembly 10. The positive refractive power of the second lens element 120 provides partial refractive power to shorten the total optical length of the wide angle photographic lens assembly 10. When being positive, the refractive power of the third lens element 130 is favorable to shorten the total length of the wide angle photographic lens assembly 10. When being negative, the refractive power of the third lens element 130 is favorable to correct aberration. The positive refractive power of the fourth lens element 140 is favorable to shorten the total optical length of the wide angle photographic lens assembly 10, and constitutes the majority of the overall positive refractive power of the wide angle photographic lens assembly 10. The negative refractive power of the fifth lens element 150 is favorable to correct the aberration of the wide angle photographic lens assembly 10. The positive refractive power of the sixth lens element 160 is favorable to lower the sensitivity of the wide angle photographic lens assembly 10. Furthermore, the convex object-side surface 111 and the concave image side-surface 112 of the first lens element 110 are favorable to expand the field of view of the wide angle photographic lens assembly 10 and lower the aberration caused by the refractive indexes of the first lens element 110 to lights. Therefore, a good balance is achieved between pursuing wider field of view and correcting aberrations.

The concave object-side surface 121 and the convex image side-surface 122 of the second lens element 120 are favorable to correct the aberration of the wide angle photographic lens assembly 110. When the object-side surface 141 of the fourth lens element 140 is convex, the positive refractive power is increased, and therefore, the total length of the wide angle photographic lens assembly 10 is shortened. When the object-side surface 151 of the fifth lens element 150 is concave, the high order aberration is corrected. When the object-side surface 152 is convex, the total length of the wide angle photographic lens assembly 10 is shortened.

When Condition 1 is satisfied, the positive refractive power of the second lens element 120 is favorable to reduce the total optical length of the wide angle photographic lens assembly 10. When Condition 2 is satisfied, part of the overall positive refractive power of the wide angle photographic lens assembly 10 is well distributed to the sixth lens element 160, and the sensitivity of the wide angle photographic lens assembly is lowered. In some embodiments, the sixth lens element 160 satisfies $0.35 < f/f_6 < 0.95$. When Condition 3 is satisfied, the maximal field of view is achieved under the condition where the total length of the wide angle photographic lens assembly 10 is not excessively long. In some embodiments, the front lens group and the aperture stop 100 satisfy $Dr4S/T_{12} < 0.2$. When Condition 4 is satisfied, the refractive power of the front lens group is favorable to shorten the total length of the wide angle photographic lens assembly 10.

Moreover, the wide angle photographic lens assembly 10 of the present disclosure may further satisfy at least one of the following conditions:

| | |
|---|---|
| $T_{23}/CT_2 < 0.4$ | (Condition 5) |
| $-1.3 < f/f_3 < 0.2$ | (Condition 6) |
| $-1.0 < R_9/f < -0.4$ | (Condition 7) |
| $0 \leq (R_7+R_8)/(R_7-R_8) \leq 1.0$ | (Condition 8) |
| $N_1 > 1.72$ | (Condition 9): |
| $0.9 < R_8/R_9 < 1.7$ | (Condition 10) |
| $28 < V_6-V_5 < 45$ | (Condition 11) |
| $-0.4 < f/f_1 < -0.1$ | (Condition 12) |
| $ImgH/f > 1.2$ | (Condition 13) |
| $HFOV > 75$ | (Condition 14) |

$T_{23}$ is the axial distance between the second lens element 120 and the third lens element 130, $CT_2$ is the thickness of the second lens element 120 near the optical axis, i.e. the axial distance between the object-side surface 121 and the image-side surface 122, $f_1$ is the focal length of the first lens element 110, $f_3$ is the focal length of the third lens element 130, $R_7$ is the curvature radius of the object-side surface 141, $R_8$ is the curvature radius of the image-side surface 142, $R_9$ is the curvature radius of the object-side surface 151, $N_1$ is the refractive index of the first lens element 110, $V_5$ is the Abbe number of the fifth lens element 150, $V_6$ is the Abbe number of the sixth lens element 160, ImgH is one half of the diagonal length of the effective photosensitive area of the image sensor 192, and HFOV is one half of the maximal viewing angle in the wide angle photographic lens assembly 10.

When Condition 5 is satisfied, the thickness of the second lens element 120 and the axial distance between the second lens element 120 and the third lens element 130 are favorable to correct spherical aberration of the wide angle photographic lens assembly 10. In some embodiments, the second lens element 120 and the third lens element 130 further satisfy $T_{23}/ImgH < 0.2$. When Condition 6 is satisfied, the thickness of the third lens element 130 is favorable to correct the aberration or further shorten the total optical length. In some embodiments, the third lens element 130 further satisfies $-1.0 < f/f_3 < 0$.

When Condition 7 is satisfied, the aberration of the wide angle photographic lens assembly 10 is corrected. When Condition 8 is satisfied, the curvatures of the object-side surface 141 and the image-side surface 142 are favorable to generate enough positive refractive power to prevent the aberration of the wide angle photographic lens assembly 10 from getting too high. When Condition 9 is satisfied, the field of view is expanded. When Condition 10 is satisfied, the curvatures of the image-side surface 142 and the object-side surface 151 are favorable to shorten the axial distance between the fourth lens element 140 and the fifth lens element 150, and therefore, the total axial distance of the wide angle lens photographic lens assembly 10 is shortened.

When Condition 11 is satisfied, the fifth lens element 150 and the sixth lens element 160 are favorable to correct chromatism of the wide angle photographic lens assembly 10. When Condition 12 is satisfied, the negative refractive power of the first lens element 110 is favorable to expand the field of view of the wide angle photographic lens assembly 10. Satisfaction to Condition 13 is favorable to miniaturize the wide angle photographic lens assembly 10, so that the wide angle photographic lens assembly 10 is suitable for being assembled in a compact and movable electric device. Satisfaction to Condition 14 is favorable to expand the field of view of the wide angle photographic lens assembly 10.

Furthermore, in the wide angle photographic lens assembly 10 of the present disclosure, all the lenses may be made of glass or plastic. If a lens is made of glass, there is more freedom in distributing the overall refractive power of the wide angle photographic lens assembly 10. If a lens element is made of plastic, the production cost is effectively reduced. In addition, the surfaces of lens elements can be aspheric and easily made into aspherical profiles, allowing more design parameter freedom which can be used to reduce aberrations and total number of the lens elements required within a lens assembly in order to produce high quality images, so that the total track length of the assembly can be reduced effectively.

In the wide angle photographic lens assembly 10 of the present disclosure, a convex surface of a lens means the surface of the lens is convex at a paraxial site. A concave surface of a lens means the surface of the lens is concave at a paraxial site. In addition, at least one stop, such as a glare stop or a field stop, may be disposed within the optical imaging system 10 to reduce the occurrence of unwanted rays, for other means to improve the image quality or to adjust the size of the object image.

In the wide angle photographic lens assembly 10 of the present disclosure, the specific schemes are further described with the following embodiments. Parameters in the embodiments are defined as follows. Fno is an f-number value of the wide angle photographic lens assembly. The aspheric surface in the embodiments may be represented by, but not limited to, the following aspheric surface equation (Formula ASP):

$$X(Y) = (Y^2/R)/(1 + \text{sqrt}(1 - (1+k)*(Y/R)^2)) + \sum_i (Ai)*(Y^i)$$

Wherein Y is the distance from the point on the curve of the aspheric surface to the optical axis, X is the height of a point on the aspheric surface at a distance Y from the optical axis relative to the tangential plane at the aspheric surface vertex, k is a cone factor, Ai is an $i^{th}$ order aspheric surface coefficient, and in the embodiments, i may be, but is not limited to, 4, 6, 8, 10 and 12.

The First Embodiment

Embodiment 1

FIG. 1A is a schematic structural view of a first embodiment of a wide angle photographic lens assembly according to the present disclosure. In this embodiment, for example, the wavelength of the light received by the wide angle photographic lens assembly 10 is 587.6 nm, but the wavelength of the light received by the wide angle photographic lens assembly 10 may be adjusted according to actual requirements, and is not limited to the wavelength value mentioned above.

In this embodiment, the refractive power of the first lens element is negative, and the object-side surface and the image-side surface are convex and concave, respectively. The refractive power of the second lens element 120 is positive, and the object-side surface and the image side-surface of the second lens element 120 are concave and convex, respectively. The refractive power of the third lens element 130 is positive. The refractive power of the fourth lens element 140 is positive and the image-side surface 142 of the fourth lens element 140 is convex. The refractive power of the fifth lens element 150 is negative and the object-side surface 151 of the fifth lens element 150 is concave. The refractive power of the sixth lens element 160 is positive image-side surface 162 of the sixth lens element 160 is convex. Moreover, the fourth lens element 140 and the sixth lens element 160 are bi-convex, respectively.

The detailed data of the wide angle photographic lens assembly 10 is as shown in Table 1-1 below.

TABLE 1-1

Embodiment 1
f = 1.16 mm, Fno = 2.05, HFOV = 90.1 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 10.051 | 1.040 | Glass | 1.804 | 46.6 | −4.98 |
| 2 | | 2.732 | 2.143 | | | | |
| 3 | Lens 2 | −4.259400 (ASP) | 3.877 | Plastic | 1.634 | 23.8 | 3.90 |
| 4 | | −2.115310 (ASP) | 0.100 | | | | |
| 5 | Ape. Stop | plano | 0.172 | | | | |
| 6 | Lens 3 | −1.672960 (ASP) | 1.097 | Plastic | 1.544 | 55.9 | 40.82 |
| 7 | | −1.915270 (ASP) | 0.100 | | | | |
| 8 | Lens 4 | 3.952800 (ASP) | 1.127 | Plastic | 1.544 | 55.9 | 1.95 |
| 9 | | −1.304470 (ASP) | 0.100 | | | | |
| 10 | Lens 5 | −0.956200 (ASP) | 0.482 | Plastic | 1.634 | 23.8 | −1.27 |
| 11 | | 6.206900 (ASP) | 0.100 | | | | |
| 12 | Lens 6 | 5.247000 (ASP) | 1.562 | Plastic | 1.544 | 55.9 | 2.21 |
| 13 | | −1.397330 (ASP) | 0.500 | | | | |
| 14 | IR-filter | plano | 0.300 | Glass | 1.516 | 64.1 | — |
| 15 | | plano | 0.500 | | | | |
| 16 | Cover-glass | plano | 0.400 | Glass | 1.516 | 64.1 | — |
| 17 | | plano | 0.396 | | | | |
| 18 | Image | plano | — | | | | |

Note:
Reference wavelength is d-line 587.6 nm

In addition, the first lens element 110 is spheric, i.e. both the object-side surface 111 and the image-side surface 112 are spheric. The second lens element 120, the third lens element 130, the fourth lens element 140, the fifth lens element 150, and the sixth lens element 160, for example, are aspheric, and the aspheric surfaces of the second lens element 120 to the sixth element 160, for example, satisfy Condition ASP, but are not limited thereto. As for the parameters of the aspheric surfaces, reference is made to Table 1-2 below.

TABLE 1-2

Aspheric Coefficients

| Surface# | 3 | 4 | 6 | 7 | 8 |
|---|---|---|---|---|---|
| k | −1.83603E+01 | −1.26244E+01 | −4.51463E−01 | 7.26299E−01 | −1.89351E+01 |
| $A_4$ | −1.10912E−02 | −5.01510E−02 | 1.61062E−01 | −6.93195E−02 | −7.59803E−02 |
| $A_6$ | 1.73853E−03 | 6.71058E−02 | −2.69888E−01 | 3.76450E−02 | −1.08313E−03 |
| $A_8$ | −1.02019E−04 | −4.44420E−02 | 3.14872E−01 | −4.51197E−03 | −1.26653E−03 |
| $A_{10}$ | 8.72225E−07 | 1.14289E−02 | −2.07206E−01 | 7.87134E−03 | 1.44193E−03 |
| $A_{12}$ | −1.01587E−25 | −1.01617E−25 | −1.01617E−25 | −1.01617E−25 | −1.01617E−25 |

| Surface# | 9 | 10 | 11 | 12 | 13 |
|---|---|---|---|---|---|
| k | −3.56827E+00 | −1.86678E+00 | 4.08173E+00 | −1.04401E+00 | −1.84160E+00 |
| $A_4$ | −5.01832E−02 | 3.53435E−02 | 1.98777E−02 | 7.39656E−03 | 1.09471E−02 |
| $A_6$ | −1.96329E−02 | −1.94252E−03 | 2.53019E−04 | −1.71646E−03 | 3.19449E−03 |
| $A_8$ | 6.74736E−03 | −7.84421E−03 | −1.56275E−03 | 1.47697E−03 | −1.81703E−03 |
| $A_{10}$ | −1.67452E−03 | 2.07200E−03 | −1.24234E−04 | −3.42319E−04 | 5.29497E−04 |
| $A_{12}$ | −1.01617E−25 | −1.01618E−25 | — | — | −1.01620E−25 |

In Table 1-1, the curvature radius, the thickness and the focal length are shown in millimeters (mm). Surface numbers 0-18 represent the surfaces sequentially arranged from the object-side to the image-side along the optical axis. "f" stands for the focal length, "Fno" is the f-number, and "HFOV" is the half field of view of this embodiment. In Table 1-2, k represents the conic coefficient of the equation of the aspheric surface profiles. A1-A12 represent the aspheric coefficients ranging from the 1st order to the 12th. All labels for Tables of the remaining embodiments share the same definitions as those in Table 1-1 and Table 1-2 of the first embodiment, and their definitions will not be stated again.

The content of Table 1-3 may be deduced from Table 1-1.

TABLE 1-3

Embodiment 1

| f (mm) | 1.16 | $f/f_6$ | 0.52 |
|---|---|---|---|
| Fno | 2.05 | $f/f_{12}$ | 0.34 |
| HFOV (deg.) | 90.10 | $Dr4S/T_{12}$ | 0.05 |
| $N_1$ | 1.80 | $T_{23}/CT_2$ | 0.07 |
| $V_6-V_5$ | 32.1 | $(R_7+R_8)/(R_7-R_8)$ | 0.50 |
| $f/f_1$ | −0.23 | $R_9/f$ | −0.83 |
| $f/f_2$ | 0.30 | $R_8/R_9$ | 1.36 |
| $f/f_3$ | 0.03 | ImgH/f | 1.75 |

In Table 1-3, the $f/f_2$, which is 0.30, of the wide angle photographic lens assembly 10 satisfies the Condition 1. The $f/f_6$, which is 0.52, of the wide angle photographic lens assembly 10 satisfies the Condition 2. The $Dr4S/T_{12}$, which is 0.05, of the wide angle photographic lens assembly 10 satisfies the Condition 3. The $f/f_{12}$, which is 0.34, of the wide angle photographic lens assembly 10 satisfies the Condition 4.

The $T_{23}/CT_2$, which is 0.07, of the wide angle photographic lens assembly 10 satisfies the Condition 5. The $f/f_3$, which is 0.03, of the wide angle photographic lens assembly 10 satisfies the Condition 6. The $R_9/f$, which is −0.83, of the wide angle photographic lens assembly 10 satisfies the Condition 7. The $(R_7+R_8)/(R_7-R_8)$, which is 0.50, of the wide angle photographic lens assembly 10 satisfies the Condition 8. The $N_1$, which is 1.80, of the wide angle photographic lens assembly 10 satisfies the Condition 9. The $R_8/R_9$, which is 1.36, of the wide angle photographic lens assembly 10 satisfies the Condition 10. The $V_6-V_5$, which is 32.1, of the wide angle photographic lens assembly 10 satisfies the Condition 11. The $f/f_1$, which is −0.23, of the wide angle photographic lens assembly 10 satisfies the Condition 12. The ImgH/f, which is 1.75, of the wide angle photographic lens assembly 10 satisfies the Condition 13. The HFOV, which is 90.10, of the wide angle photographic lens assembly 10 satisfies the Condition 14.

FIG. 1B is a schematic view of longitudinal spherical aberration curves when the lights having wavelengths of 486.1 nm, 587.6 nm, and 656.3 nm are respectively projected in the wide angle photographic lens assembly 10 in FIG. 1A. The longitudinal spherical aberration curve of the light having the wavelength of 486.1 nm in the wide angle photographic lens assembly 10 is indicated by a solid line L in FIG. 1B. The longitudinal spherical aberration curve of the light having the wavelength of 587.6 nm in the wide angle photographic lens assembly 10 is indicated by a dashed line M in FIG. 1B. The longitudinal spherical aberration curve of the light having the wavelength of 656.3 nm in the wide angle photographic lens assembly 10 is indicated by a dotted line N in FIG. 1B. Horizontal axis is the focus position (millimeter, mm), and vertical axis is the normalized entrance pupil or aperture value. In other words, after the paraxial light and the fringe light which are parallel to the optical axis enter in the wide angle photographic lens assembly 10, the differences between the focus positions of the paraxial light (the longitudinal coordinate is close to 0) and the fringe light (the longitudinal coordinate is close to 1) can be observed from the longitudinal spherical aberration curves. It can be observed from FIG. 1B that, no matter the wavelength of the light received by the wide angle photographic lens assembly 10 of this embodiment is 486.1 nm, 587.6 nm, or 656.3 nm, the longitudinal spherical aberration generated by the wide angle photographic lens assembly 10 is within the range of −0.025 mm to 0.0 mm.

In the second embodiment to the seventh embodiment and the schematic views of the longitudinal spherical aberration curves in FIGS. 2B, 3B, 4B, 5B, 6B, and 7B, the solid line L indicates the longitudinal spherical aberration curve of the light having the wavelength of 486.1 nm, the dashed line M indicates the longitudinal spherical aberration curve of the light having the wavelength of 587.6 nm, and the dotted line N indicates the longitudinal spherical aberration curve of the light having the wavelength of 656.3 nm, which will not be repeated herein for the sake of conciseness.

FIG. 1C is a schematic view of astigmatic field curves when the light having the wavelength of 587.6 nm is projected in the wide angle photographic lens assembly 10 in FIG. 1A. An astigmatic field curve of a tangential plane is a dashed line T in FIG. 1C. An astigmatic field curve of a sagittal plane is a solid line S in FIG. 1C. Horizontal axis is the focus position (mm), and longitudinal axis is the image height (mm) or HFOV (deg.). In other words, the differences in focus position due to different curvatures of the tangential plane and the sagittal plane can be observed from the astigmatic field curves. It can be observed from FIG. 1C that, when the light having the wavelength of 587.6 nm is projected in the wide angle photographic lens assembly 10, the astigmatic field curvature of the tangential plane is within a range of −0.1 mm to 0.03 mm, and the astigmatic field curvature of the sagittal plane is within a range of −0.05 mm to 0.0 mm.

In the second embodiment to the seventh embodiment and the schematic views of the astigmatic field curves in FIGS. 2C, 3C, 4C, 5C, 6C, and 7C, the solid line S indicates the astigmatic field curve of the sagittal plane 6 and the dashed line T indicates the astigmatic field curve of the tangential plane, which will not be repeated herein for the sake of conciseness.

FIG. 1D is a schematic view of a distortion curve when the light having the wavelength of 587.6 nm is projected in the wide angle photographic lens assembly in FIG. 1A. Horizontal axis is the distortion ratio (%), and vertical axis is the image height (mm) or HFOV (deg.). In other words, the differences of the distortion ratios caused by different image heights can be observed from the distortion curve G. It can be observed from FIG. 1D that, the distortion ratio generated when the light having the wavelength of 587.6 nm is projected in the wide angle photographic lens assembly 10 is within a range of −100% to 0%. As shown in FIGS. 1B to 1D, the wide angle photographic lens assembly 10, designed according to the first embodiment, can achieve a balance between correcting the aberration and pursuing the wide field of view.

In the second embodiment to the seventh embodiment and the schematic views of the distortion curves in FIGS. 2D, 3D, 4D, 5D, 6D, and 7D, the solid line G indicates the distortion curve of the light having the wavelength of 587.6 nm, which will not be repeated herein for the sake of conciseness.

It should be noted that, the distortion curves and the astigmatic field curves generated when the lights having the wavelength of 486.1 nm and 656.3 nm are projected in the wide angle photographic lens assembly 10 are close to the distortion curve and the astigmatic field curves generated when the light having the wavelength of 587.6 nm is projected in the wide angle photographic lens assembly 10. In order to prevent visual confusion about FIGS. 1C and 1D, the distortion curve and the astigmatic field curves of the lights having wavelengths of 486.1 nm and 656.3 nm which are projected in the wide angle photographic lens assembly 10 are not shown in FIGS. 1C and 1D, and the same is in the second embodiment to the seventh embodiment.

The Second Embodiment

Embodiment 2

Figure 2A:
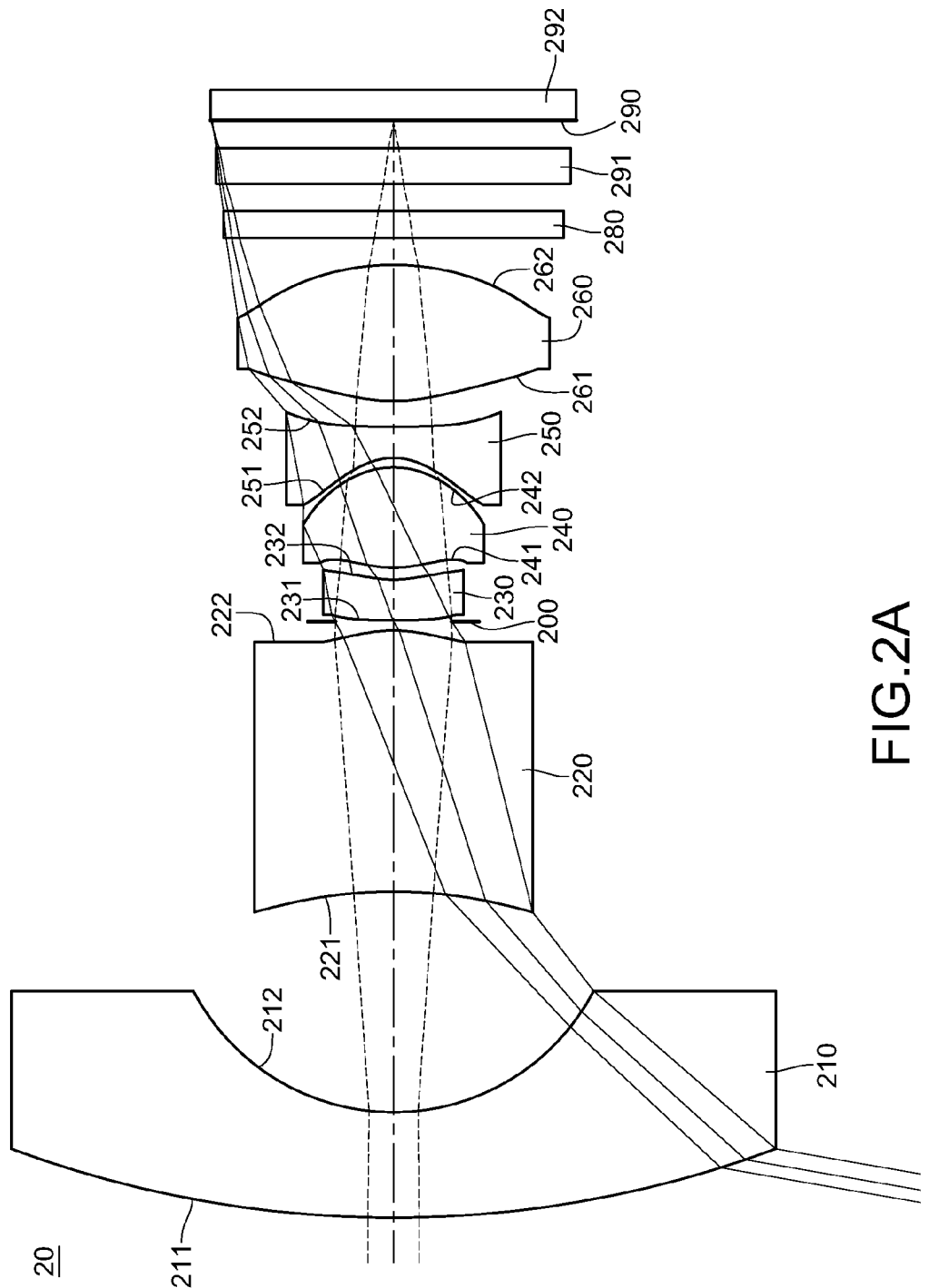
FIG. 2A is a schematic structural view of a second embodiment of a wide angle photographic lens assembly according to the present disclosure.

FIG. 2A is a schematic structural view of a second embodiment of a wide angle photographic lens assembly according to the present disclosure. The specific implementation is substantially the same as that in the first embodiment, and the elements in the second embodiment are the same as those in the first embodiment, so that the element symbols all begin with "2" as the hundredth digit, which represents that the elements have the same function or structure. For the sake of conciseness, only the differences are illustrated below, and the similar parts will not be repeated herein.

In this embodiment, for example, the wavelength of the light received by the wide angle photographic lens assembly 20 is 587.6 nm, but this wavelength of the light received by the wide angle photographic lens assembly 20 may be adjusted according to actual requirements, and is not limited to the wavelength value mentioned above.

In this embodiment, the refractive power of a first lens element 210 is negative, and the first lens element 210 has a convex object-side surface 211 and a concave image-side surface 212. The refractive power of a second lens element 220 is positive, and the second lens element 220 has a concave object-side surface 221 and a convex image-side surface 222. The refractive power of a third lens element 230 is negative. The refractive power of a fourth lens element 240 is positive, and the fourth lens element 240 has a convex image-side surface 242. The refractive power of a fifth lens element 250 is negative and the fifth lens element 250 has a concave object-side surface 251. The refractive power of a sixth lens element 260 is positive power, and the sixth lens element 260 has a convex image-side surface 262. Moreover, both the fourth lens element 240 and the sixth lens element 260 are bi-convex.

The detailed data of the wide angle photographic lens assembly 20 is as shown in Table 2-1 below.

TABLE 2-1

Embodiment 2
f = 1.42 mm, Fno = 2.50, HFOV = 80.1 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 12.124 | 1.170 | Glass | 1.804 | 46.6 | −4.14 |
| 2 | | 2.500 | 2.449 | | | | |
| 3 | Lens 2 | −5.678500 (ASP) | 2.900 | Plastic | 1.621 | 24.4 | 2.44 |
| 4 | | −1.428990 (ASP) | 0.100 | | | | |

TABLE 2-1-continued

Embodiment 2
f = 1.42 mm, Fno = 2.50, HFOV = 80.1 deg.

| Surface # | | Curvature Radius | Thickness | Material | Index | Abbe # | Focal length |
|---|---|---|---|---|---|---|---|
| 5 | Ape. Stop | plano | 0.016 | | | | |
| 6 | Lens 3 | 100.000000 (ASP) | 0.450 | Plastic | 1.544 | 55.9 | −2.27 |
| 7 | | 1.216370 (ASP) | 0.132 | | | | |
| 8 | Lens 4 | 1.234090 (ASP) | 1.113 | Plastic | 1.530 | 55.8 | 1.22 |
| 9 | | −0.936960 (ASP) | 0.106 | | | | |
| 10 | Lens 5 | −0.678320 (ASP) | 0.346 | Plastic | 1.633 | 23.4 | −1.03 |
| 11 | | 18.543100 (ASP) | 0.285 | | | | |
| 12 | Lens 6 | 1.787130 (ASP) | 1.511 | Plastic | 1.544 | 55.9 | 2.24 |
| 13 | | −2.697180 (ASP) | 0.300 | | | | |
| 14 | IR-filter | plano | 0.300 | Glass | 1.516 | 64.1 | — |
| 15 | | plano | 0.300 | | | | |
| 16 | Cover-glass | plano | 0.400 | Glass | 1.516 | 64.1 | — |
| 17 | | plano | 0.303 | | | | |
| 18 | Image | plano | — | | | | |

Note:
Reference wavelength is d-line 587.6 nm

In addition, the first lens element 210 is spheric. The second lens element 220, the third lens element 230, the fourth lens element 240, the fifth lens element 250, and the sixth lens element 260 are aspheric, and the aspheric surfaces, for example, satisfy Condition ASP, but are not limited thereto. As for the parameters of the aspheric surfaces, reference is made to Table 2-2 below.

TABLE 2-2

Aspheric Coefficients

| Surface # | 3 | 4 | 6 | 7 | 8 |
|---|---|---|---|---|---|
| k | −2.22930E+00 | −1.11495E+01 | −8.00000E+01 | −1.48938E+01 | −9.67896E+00 |
| $A_4$ | −1.48254E−02 | 3.80500E−02 | 3.21876E−01 | −1.64771E−01 | −1.15571E−01 |
| $A_6$ | 6.46417E−03 | 2.83858E−02 | −2.33397E−01 | 9.72067E−02 | −5.92601E−02 |
| $A_8$ | −6.35613E−04 | −5.26089E−02 | 1.73257E−01 | 1.57970E−02 | −1.38754E−01 |
| $A_{10}$ | −6.82952E−05 | 2.40550E−02 | −3.72079E−02 | 4.09259E−02 | −1.57663E−01 |
| $A_{12}$ | −2.98794E−15 | −2.96919E−15 | −2.96919E−15 | −2.96919E−15 | −2.96919E−15 |

| Surface # | 9 | 10 | 11 | 12 | 13 |
|---|---|---|---|---|---|
| k | −1.05740E+00 | −1.89290E+00 | 1.99543E+02 | −1.08437E+01 | −2.17061E+01 |
| $A_4$ | −5.91238E−02 | −8.51472E−02 | 5.00027E−02 | 2.19775E−03 | −9.49479E−02 |
| $A_6$ | −4.77129E−02 | 5.42903E−02 | 2.43128E−02 | −1.27190E−02 | 4.72332E−02 |
| $A_8$ | 7.32534E−02 | 7.83195E−02 | −1.39712E−02 | 6.35827E−03 | −1.79913E−02 |
| $A_{10}$ | −7.29590E−02 | 2.98226E−02 | −9.45365E−04 | −6.86662E−04 | 2.96470E−03 |
| $A_{12}$ | −2.96919E−15 | −2.96919E−15 | — | — | −2.96919E−15 |

The content of Table 2-3 may be deduced from Table 2-1.

TABLE 2-3

Embodiment 2

| f (mm) | 1.42 | $f/f_6$ | 0.63 |
|---|---|---|---|
| Fno | 2.50 | $f/f_{12}$ | 0.83 |
| HFOV (deg.) | 80.10 | $Dr4S/T_{12}$ | 0.04 |
| $N_1$ | 1.80 | $T_{23}/CT_2$ | 0.04 |
| $V_6-V_5$ | 32.5 | $(R_7 + R_8)/(R_7 - R_8)$ | 0.14 |
| $f/f_1$ | −0.34 | $R_9/f$ | −0.48 |
| $f/f_2$ | 0.58 | $R_8/R_9$ | 1.38 |
| $f/f_3$ | −0.63 | ImgH/f | 1.42 |

FIG. 2B is a schematic view of longitudinal spherical aberration curves when the lights having wavelengths of 486.1 nm, 587.6 nm, and 656.3 nm are respectively projected in the wide angle photographic lens assembly 20 in FIG. 2A. It can be observed from FIG. 2B that, no matter the wavelength of the light received by the wide angle photographic lens assembly 20 of this embodiment is 486.1 nm, 587.6 nm, or 656.3 nm, the longitudinal spherical aberration generated by the wide angle photographic lens assembly 10 is within the range of −0.05 mm to 0.0 mm.

FIG. 2C is a schematic view of astigmatic field curves when the light having the wavelength of 587.6 nm is projected in the wide angle photographic lens assembly 20 in FIG. 2A. It can be observed from FIG. 2C that, when the light having the wavelength of 587.6 nm is projected in the wide angle photographic lens assembly 20, the astigmatic field curvature of the tangential plane is within a range of −0.05 mm to 0.05 mm, and the astigmatic field curvature of the sagittal plane is within a range of −0.05 mm to 0.05 mm.

FIG. 2D is a schematic view of a distortion curve when the light having the wavelength of 587.6 nm is projected in the wide angle photographic lens assembly 20 in FIG. 2A. It can be observed from FIG. 2D that, the distortion ratio generated when the light having the wavelength of 587.6 nm is projected in the wide angle photographic lens assembly 20 is within a range of −75% to 0%. As shown in FIGS. 2B to 2D, the wide angle photographic lens assembly 20, designed according to the second embodiment, can balance the aberration correction and wide field of view.

The Third Embodiment

Embodiment 3

FIG. 3A is a schematic structural view of a third embodiment of a wide angle photographic lens assembly according to the present disclosure. The specific implementation is substantially the same as that in the first embodiment, and the elements in the third embodiment are the same as those in the first embodiment, so that the element symbols all begin with "3" as the hundredth digit, which represents that the elements have the same function or structure. For the sake of conciseness, only the differences are illustrated below, and the similar parts will not be repeated herein.

In this embodiment, for example, the wavelength of the light received by the wide angle photographic lens assembly 30 is 587.6 nm, but the wavelength of the light received by the wide angle photographic lens assembly 30 may be adjusted according to actual requirements, and is not limited to the wavelength value mentioned above.

In this embodiment, the refractive power of a first lens element 310 is negative, and the first lens element 310 has a convex object-side surface 311 and a concave image-side surface 312. The refractive power of a second lens element 320 is positive, and the second lens element 320 has a concave object-side surface 321 and a convex image-side surface 322. The refractive power of a third lens element 330 is negative. The refractive power of a fourth lens element 340 is positive, and the fourth lens element 340 has a convex image-side surface 342. The refractive power of a fifth lens element 350 is negative, and the fifth lens element 350 has a concave object-side surface 351. The refractive power of a sixth lens element 360 is positive, and the sixth lens element 360 has a convex image-side surface 362. Moreover, both the fourth lens element 340 and the sixth lens element 360 are bi-convex lens elements.

The detailed data of the wide angle photographic lens assembly 30 is as shown in Table 3-1 below.

TABLE 3-1

Embodiment 3
f = 1.35 mm, Fno = 2.40, HFOV = 90.1 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 11.610 | 1.170 | Glass | 1.804 | 46.6 | −4.61 |
| 2 | | 2.684 | 2.402 | | | | |
| 3 | Lens 2 | −4.058600 (ASP) | 2.900 | Plastic | 1.621 | 24.4 | 1.92 |
| 4 | | −1.174700 (ASP) | 0.100 | | | | |
| 5 | Ape. Stop | plano | 0.133 | | | | |
| 6 | Lens 3 | −1.237820 (ASP) | 0.450 | Plastic | 1.544 | 55.9 | −1.47 |
| 7 | | 2.533880 (ASP) | 0.100 | | | | |
| 8 | Lens 4 | 1.055230 (ASP) | 1.118 | Plastic | 1.530 | 55.8 | 1.11 |
| 9 | | −0.835830 (ASP) | 0.107 | | | | |
| 10 | Lens 5 | −0.696040 (ASP) | 0.367 | Plastic | 1.633 | 23.4 | −1.04 |
| 11 | | 15.731400 (ASP) | 0.115 | | | | |
| 12 | Lens 6 | 2.618440 (ASP) | 2.259 | Plastic | 1.544 | 55.9 | 2.31 |
| 13 | | −1.689500 (ASP) | 0.437 | | | | |
| 14 | IR-filter | plano | 0.300 | Glass | 1.516 | 64.1 | — |
| 15 | | plano | 0.326 | | | | |
| 16 | Cover-glass | plano | 0.400 | Glass | 1.516 | 64.1 | — |
| 17 | | plano | 0.143 | | | | |
| 18 | Image | plano | — | | | | |

Note:
Reference wavelength is d-line 587.6 nm

In addition, the first lens element 310 is spheric. The second lens element 320, the third lens element 330, the fourth lens element 340, the fifth lens element 350, and the sixth lens element 360 are aspheric, and the aspheric surfaces, for example, satisfy Condition ASP, but are not limited thereto. As for the parameters of the aspheric surfaces, reference is made to Table 3-2 below.

TABLE 3-2

Aspheric Coefficients

| Surface # | 3 | 4 | 6 | 7 | 8 |
|---|---|---|---|---|---|
| k | −1.12469E+00 | −8.57159E+00 | −2.02892E+01 | −2.22429E+00 | −5.94604E+00 |
| $A_4$ | −1.23554E−02 | −2.62467E−02 | 1.87878E−01 | −2.86449E−01 | −1.10168E−01 |
| $A_6$ | 5.80075E−03 | 8.44455E−02 | −2.20824E−01 | −1.45821E−01 | −4.05342E−02 |
| $A_8$ | −5.52763E−04 | −7.75152E−02 | −4.93497E−04 | 1.78735E−01 | −6.52604E−02 |
| $A_{10}$ | −2.50420E−05 | 2.24772E−02 | −1.54041E−03 | −1.16315E−01 | −1.61016E−01 |
| $A_{12}$ | 2.85396E−19 | 2.86140E−19 | 2.86140E−19 | 2.86140E−19 | 2.86140E−19 |

TABLE 3-2-continued

| Surface # | 9 | 10 | 11 | 12 | 13 |
|---|---|---|---|---|---|
| k | −2.23499E+00 | −2.43382E+00 | 1.01462E+02 | −2.80690E+01 | −3.32964E+00 |
| $A_4$ | −2.88870E−03 | −3.95939E−02 | 5.12353E−02 | 9.86456E−03 | −3.63099E−02 |
| $A_6$ | −8.47161E−02 | −7.23182E−03 | 1.59703E−03 | 2.33327E−03 | 1.20072E−02 |
| $A_8$ | −1.82971E−03 | 1.56995E−02 | −1.05066E−02 | 2.19647E−03 | −3.63125E−03 |
| $A_{10}$ | −1.44949E−02 | 8.21342E−04 | 8.80870E−04 | −9.13444E−04 | 8.57219E−04 |
| $A_{12}$ | 2.86140E−19 | 2.86140E−19 | — | — | 2.86140E−19 |

The content of Table 3-3 may be deduced from Table 3-1.

TABLE 3-3

| Embodiment 3 | | | |
|---|---|---|---|
| f (mm) | 1.35 | $f/f_6$ | 0.58 |
| Fno | 2.40 | $f/f_{12}$ | 1.02 |
| HFOV (deg.) | 90.10 | $Dr4S/T_{12}$ | 0.04 |
| $N_1$ | 1.80 | $T_{23}/CT_2$ | 0.08 |
| $V_6-V_5$ | 32.5 | $(R_7 + R_8)/(R_7 - R_8)$ | 0.12 |
| $f/f_1$ | −0.29 | $R_9/f$ | −0.52 |
| $f/f_2$ | 0.70 | $R_8/R_9$ | 1.20 |
| $f/f_3$ | −0.92 | ImgH/f | 1.50 |

FIG. 3B is a schematic view of longitudinal spherical aberration curves when the lights having wavelengths of 486.1 nm, 587.6 nm, and 656.3 nm are respectively projected in the wide angle photographic lens assembly 30 in FIG. 3A. It can be observed from FIG. 3B that, no matter the wavelength of the light received by the wide angle photographic lens assembly 30 of this embodiment is 486.1 nm, 587.6 nm, or 656.3 nm, the longitudinal spherical aberration generated by the wide angle photographic lens assembly 10 is within the range of −0.05 mm to 0.02 mm.

FIG. 3C is a schematic view of astigmatic field curves when the light having the wavelength of 587.6 nm is projected in the wide angle photographic lens assembly 30 in FIG. 3A. It can be observed from FIG. 3C that, when the light having the wavelength of 587.6 nm is projected in the wide angle photographic lens assembly 30, the astigmatic field curvature of the tangential plane generated is within a range of −0.15 mm to 0.01 mm, and the astigmatic field curvature of the sagittal plane is within a range of −0.1 mm to 0.02 mm.

FIG. 3D is a schematic view of a distortion curve when the light having the wavelength of 587.6 nm is projected in the wide angle photographic lens assembly in FIG. 3A. It can be observed from FIG. 3D that, the distortion ratio generated when the light having the wavelength of 587.6 nm is projected in the wide angle photographic lens assembly 30 is within a range of −100% to 0%. As shown in FIGS. 3B to 3D, the wide angle photographic lens assembly 30, designed according to the third embodiment, can balance the aberration correction and wide field of view.

The Fourth Embodiment

Embodiment 4

FIG. 4A is a schematic structural view of a fourth embodiment of the wide angle photographic lens assembly according to the present disclosure. The specific implementation and elements of the fourth embodiment are substantially the same as these in the first embodiment, so that the element symbols all begin with "4" the hundredth digit which represents that the elements have the same function or structure. For the sake of conciseness, only the differences are illustrated below, and the similar parts will not be repeated herein.

FIG. 4A is a schematic structural view of a fourth embodiment of a wide angle photographic lens assembly according to the present disclosure. The specific implementation is substantially the same as that in the fourth embodiment, and the elements in the fourth embodiment are the same as those in the first embodiment, so that the element symbols all begin with "4" as the hundredth digit, which represents that the elements have the same function or structure. For the sake of conciseness, only the differences are illustrated below, and the similar parts will not be repeated herein.

In this embodiment, for example, the wavelength of the light received by the wide angle photographic lens assembly 40 is 587.6 nm, but the wavelength of the light received by the wide angle photographic lens assembly 40 may be adjusted according to actual requirements, and is not limited to the wavelength value mentioned above.

In this embodiment, the refractive power of a first lens element 410 is negative, and the first lens element 410 has a convex object-side surface 411 and a concave image-side surface 412. The refractive power of a second lens element 420 is positive, and the second lens element 420 has a concave object-side surface 421 and a convex image-side surface 422. The refractive power of a third lens element 430 is negative. The refractive power of a fourth lens element 440 is positive, and the fourth lens element 440 has a convex image-side surface 442. The refractive power of a fifth lens element 450 is negative, and the fifth lens element 450 has a concave object-side surface 451. The refractive power of a sixth lens element 460 is positive, and the sixth lens element 460 has a convex image-side surface 462. Moreover, both the fourth lens element 440 and the sixth lens element 460 are bi-convex.

The detailed data of the wide angle photographic lens assembly 40 is as shown in Table 4-1 below.

TABLE 4-1

| Embodiment 4 f = 0.84 mm, Fno = 2.30, HFOV = 80.1 deg. | | | | | | |
|---|---|---|---|---|---|---|
| Surface # | | Curvature Radius | Thickness | Material | Index | Abbe # | Focal length |
| 0 | Object | plano | Infinity | | | | |
| 1 | Lens 1 | 10.789 | 1.170 | Glass | 1.804 | 46.6 | −4.32 |
| 2 | | 2.500 | 2.019 | | | | |
| 3 | Lens 2 | −3.816000 (ASP) | 2.900 | Plastic | 1.621 | 24.4 | 3.53 |

TABLE 4-1-continued

Embodiment 4
f = 0.84 mm, Fno = 2.30, HFOV = 80.1 deg.

| Surface # | | Curvature Radius | Thickness | Material | Index | Abbe # | Focal length |
|---|---|---|---|---|---|---|---|
| 4 | | −1.827830 (ASP) | 0.273 | | | | |
| 5 | Ape. Stop | plano | 0.100 | | | | |
| 6 | Lens 3 | −1.675270 (ASP) | 0.450 | Plastic | 1.544 | 55.9 | −5.01 |
| 7 | | −4.958600 (ASP) | 0.100 | | | | |
| 8 | Lens 4 | 4.010000 (ASP) | 1.207 | Plastic | 1.530 | 55.8 | 0.99 |
| 9 | | −0.541760 (ASP) | 0.100 | | | | |
| 10 | Lens 5 | −0.424290 (ASP) | 0.331 | Plastic | 1.633 | 23.4 | −0.92 |
| 11 | | −2.000000 (ASP) | 0.100 | | | | |
| 12 | Lens 6 | 12.623000 (ASP) | 1.634 | Plastic | 1.544 | 55.9 | 1.71 |
| 13 | | −0.957920 (ASP) | 0.500 | | | | |
| 14 | IR-filter | plano | 0.300 | Glass | 1.516 | 64.1 | — |
| 15 | | plano | 0.500 | | | | |
| 16 | Cover-glass | plano | 0.400 | Glass | 1.516 | 64.1 | — |
| 17 | | plano | 0.100 | | | | |
| 18 | Image | plano | — | | | | |

Note:
Reference wavelength is d-line 587.6 nm

In addition, the first lens element 410 is spheric. The second lens element 420, the third lens element 430, the fourth lens element 440, the fifth lens element 450, and the sixth lens element 460 are aspheric lens elements, and the aspheric surfaces, for example, satisfy Condition ASP, but are not limited thereto. As for the parameters of the aspheric surfaces, reference is made to Table 4-2 below.

TABLE 4-2

Aspheric Coefficients

| Surface # | 3 | 4 | 6 | 7 | 8 |
|---|---|---|---|---|---|
| k | −8.00000E+01 | −1.00585E+01 | −6.28176E+00 | −8.00000E+01 | 1.40569E+01 |
| $A_4$ | −1.37533E−02 | −4.63730E−02 | 5.11768E−01 | 1.67891E−01 | −1.12390E−01 |
| $A_6$ | 1.56949E−03 | 5.11549E−02 | −2.40985E+00 | −2.64423E−02 | −3.01364E−02 |
| $A_8$ | 4.67020E−05 | −2.94192E−02 | 9.02918E+00 | 1.48329E−01 | 5.37286E−02 |
| $A_{10}$ | −1.13715E−05 | 7.00815E−03 | −1.33501E+01 | −9.95188E−02 | −9.88267E−02 |
| $A_{12}$ | −3.83463E−21 | 4.48636E−22 | 4.48636E−22 | 4.48636E−22 | 4.48636E−22 |

| Surface # | 9 | 10 | 11 | 12 | 13 |
|---|---|---|---|---|---|
| k | −3.57711E+00 | −2.97456E+00 | −6.24986E+01 | 1.17150E+01 | −1.74103E+00 |
| $A_4$ | −2.34700E−01 | −4.24264E−02 | 8.76195E−02 | 2.56923E−02 | 4.86330E−02 |
| $A_6$ | −6.04961E−03 | −3.30651E−02 | −1.18629E−02 | −5.23360E−03 | −1.21468E−02 |
| $A_8$ | 3.17274E−02 | −1.19475E−02 | −5.75497E−03 | 2.44768E−03 | −4.14242E−03 |
| $A_{10}$ | −3.11467E−02 | 2.21304E−02 | 1.66698E−04 | −3.95432E−04 | 2.07253E−03 |
| $A_{12}$ | 4.48636E−22 | 4.48636E−22 | — | — | 4.48636E−22 |

The content of Table 4-3 may be deduced from Table 4-1.

TABLE 4-3

Embodiment 4

| f (mm) | 0.84 | $f/f_6$ | 0.49 |
|---|---|---|---|
| Fno | 2.30 | $f/f_{12}$ | 0.26 |
| HFOV (deg.) | 80.10 | $Dr4S/T_{12}$ | 0.14 |
| $N_1$ | 1.80 | $T_{23}/CT_2$ | 0.13 |
| $V_6-V_5$ | 32.5 | $(R_7 + R_8)/(R_7 − R_8)$ | 0.76 |
| $f/f_1$ | −0.19 | $R_9/f$ | −0.51 |
| $f/f_2$ | 0.24 | $R_8/R_9$ | 1.28 |
| $f/f_3$ | −0.17 | ImgH/f | 2.41 |

FIG. 4B is a schematic view of longitudinal spherical aberration curves when the lights having a wavelength of 486.1 nm, 587.6 nm, and 656.3 nm are respectively projected in the wide angle photographic lens assembly 40 in FIG. 4A. It can be observed from FIG. 4B that, no matter the wavelength of the light received by the wide angle photographic lens assembly 40 of this embodiment is 486.1 nm, 587.6 nm, or 656.3 nm, the longitudinal spherical aberration generated by the wide angle photographic lens assembly 10 is within the range of −0.025 mm to 0.04 mm.

FIG. 4C is a schematic view of astigmatic field curves when the light having the wavelength of 587.6 nm is projected in the wide angle photographic lens assembly 40 in FIG. 4A. It can be observed from FIG. 4C that, when the light having the wavelength of 587.6 nm is projected in the wide angle photographic lens assembly 40, the astigmatic field curvature of the tangential plane is within a range of −0.05 mm to 0.1 mm, and the astigmatic field curvature of the sagittal plane is within a range of 0.0 mm to 0.05 mm.

FIG. 4D is a schematic view of a distortion curve when the light having the wavelength of 587.6 nm is projected in the wide angle photographic lens assembly 40 in FIG. 4A. It can be observed from FIG. 4D that, the distortion ratio generated when the light having the wavelength of 587.6 nm is projected in the wide angle photographic lens assembly 40 is within a range of −75% to 0%. As shown in FIGS. 4B to 4D, the wide angle photographic lens assembly 40, designed according to the fourth embodiment, can balance the aberration correction and wide field of view.

The Fifth Embodiment

Embodiment 5

FIG. 5A is a schematic structural view of a fifth embodiment of a wide angle photographic lens assembly according to the present disclosure. The specific implementation is substantially the same as that in the first embodiment, and the elements in the fifth embodiment are the same as those in the first embodiment, so that the element symbols all begin with "5" as the hundredth digit, which represents that the elements have the same function or structure. For the sake of conciseness, only the differences are illustrated below, and the similar parts will not be repeated herein. In this embodiment, for example, the wavelength of the light received by the wide angle photographic lens assembly 50 is 587.6 nm, but the wavelength of the light received by the wide angle photographic lens assembly 50 may be adjusted according to actual requirements, and is not limited to the wavelength value mentioned above.

In this embodiment, the refractive power of a first lens element 510 is negative, and the first lens element 510 has a convex object-side surface 511 and a concave image-side surface 512. The refractive power of a second lens element 520 is positive, and the second lens element 520 has a concave object-side surface 521 and a convex image-side surface 522. The refractive power of a third lens element 530 is negative. The refractive power of a fourth lens element 540 is positive, and the fourth lens element 540 has a convex image-side surface 542. The refractive power of a fifth lens element 550 is negative, and the fifth lens element 550 has a concave object-side surface 551. The refractive power of a sixth lens element 560 is positive, and the sixth lens element 560 has a convex image-side surface 562. Moreover, both the fourth lens element 540 and the sixth lens element 560 are bi-convex.

The detailed data of the wide angle photographic lens assembly 50 is as shown in Table 5-1 below.

TABLE 5-1

Embodiment 5
f = 0.97 mm, Fno = 2.10, HFOV = 90.1 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 9.958 | 1.170 | Glass | 1.804 | 46.6 | −4.81 |
| 2 | | 2.638 | 1.933 | | | | |
| 3 | Lens 2 | −5.230400 (ASP) | 3.349 | Plastic | 1.633 | 23.4 | 4.50 |
| 4 | | −2.302010 (ASP) | 0.161 | | | | |
| 5 | Ape. Stop | plano | 0.129 | | | | |
| 6 | Lens 3 | −1.254370 (ASP) | 0.450 | Plastic | 1.530 | 55.8 | −2.76 |
| 7 | | −9.823500 (ASP) | 0.100 | | | | |
| 8 | Lens 4 | 1.352260 (ASP) | 1.269 | Plastic | 1.530 | 55.8 | 1.21 |
| 9 | | −0.824520 (ASP) | 0.166 | | | | |
| 10 | Lens 5 | −0.696180 (ASP) | 0.367 | Plastic | 1.633 | 23.4 | −1.04 |
| 11 | | 14.213600 (ASP) | 0.100 | | | | |
| 12 | Lens 6 | 5.246100 (ASP) | 1.859 | Plastic | 1.544 | 55.9 | 1.66 |
| 13 | | −0.954450 (ASP) | 0.506 | | | | |
| 14 | IR-filter | plano | 0.200 | Glass | 1.516 | 64.1 | — |
| 15 | | plano | 0.372 | | | | |
| 16 | Cover-glass | plano | 0.300 | Glass | 1.516 | 64.1 | — |
| 17 | | plano | 0.219 | | | | |
| 18 | Image | plano | — | | | | |

Note:
Reference wavelength is d-line 587.6 nm

In addition, the first lens element 510 is spheric. The second lens element 520, the third lens element 530, the fourth lens element 540, the fifth lens element 550, and the sixth lens element 560 are aspheric, and the aspheric surfaces, for example, satisfy Condition ASP, but are not limited thereto. As for the parameters of the aspheric surfaces, reference is made to Table 5-2 below.

TABLE 5-2

Aspheric Coefficients

| Surface# | 3 | 4 | 6 | 7 | 8 |
|---|---|---|---|---|---|
| k | −8.00000E+01 | −2.24775E+01 | −1.09158E+01 | −7.80387E+01 | −7.57097E+00 |
| $A_4$ | −1.30880E−02 | −5.34903E−02 | 2.20476E−02 | −1.01996E−01 | −3.44609E−02 |
| $A_6$ | 1.74284E−03 | 1.36078E−01 | −2.72723E−02 | −2.49910E−04 | −1.48739E−02 |
| $A_8$ | −5.60568E−05 | −1.26551E−01 | 2.13114E−01 | −6.20836E−02 | −2.49418E−02 |
| $A_{10}$ | −2.44493E−06 | 4.79505E−02 | −5.70982E−01 | 2.13204E−02 | −1.78498E−02 |
| $A_{12}$ | 2.33217E−19 | 2.33965E−19 | 2.33965E−19 | 2.33965E−19 | 2.33965E−19 |

TABLE 5-2-continued

| Surface# | 9 | 10 | 11 | 12 | 13 |
|---|---|---|---|---|---|
| k | −2.94387E+00 | −2.32809E+00 | 5.88958E+01 | 7.61182E−01 | −1.86996E+00 |
| $A_4$ | 1.53297E−03 | 1.82180E−02 | 7.27940E−03 | −5.47247E−04 | 1.42503E−02 |
| $A_6$ | −2.94583E−02 | 6.26640E−04 | 3.06996E−03 | −6.81946E−03 | 2.03207E−03 |
| $A_8$ | −4.12885E−03 | −2.51547E−03 | −1.83382E−03 | 3.36934E−03 | −2.42929E−03 |
| $A_{10}$ | −4.03114E−03 | 9.65246E−04 | −4.41455E−04 | −5.74345E−04 | 5.71262E−04 |
| $A_{12}$ | 2.33965E−19 | 2.33965E−19 | — | — | 2.33965E−19 |

The content of Table 5-3 may be deduced from Table 5-1.

TABLE 5-3

| Embodiment 5 | | | |
|---|---|---|---|
| f (mm) | 0.97 | $f/f_6$ | 0.59 |
| Fno | 2.10 | $f/f_{12}$ | 0.20 |
| HFOV (deg.) | 90.10 | $Dr4S/T_{12}$ | 0.08 |
| $N_1$ | 1.80 | $T_{23}/CT_2$ | 0.09 |
| $V_6-V_5$ | 32.5 | $(R_7+R_8)/(R_7-R_8)$ | 0.24 |
| $f/f_1$ | −0.20 | $R_9/f$ | −0.72 |
| $f/f_2$ | 0.22 | $R_8/R_9$ | 1.18 |
| $f/f_3$ | −0.35 | ImgH/f | 2.07 |

FIG. 5B is a schematic view of longitudinal spherical aberration curves when the lights having wavelengths of 486.1 nm, 587.6 nm, and 656.3 nm are respectively projected in the wide angle photographic lens assembly 50 in FIG. 5A. It can be observed from FIG. 5B that, no matter the wavelength of the light received by the wide angle photographic lens assembly 50 of this embodiment is 486.1 nm, 587.6 nm, or 656.3 nm, the longitudinal spherical aberration generated by the wide angle photographic lens assembly 10 is within the range of −0.05 mm to 0.01 mm.

FIG. 5C is a schematic view of astigmatic field curves when the light having the wavelength of 587.6 nm is projected in the wide angle photographic lens assembly 50 in FIG. 5A. It can be observed from FIG. 5C that, the astigmatic field curvature of the tangential plane generated when the light having the wavelength of 587.6 nm is projected in the wide angle photographic lens assembly 50 is within a range of −0.05 mm to 0.05 mm, and the astigmatic field curvature of the sagittal plane is within a range of −0.05 mm to 0.0 mm.

FIG. 5D is a schematic view of a distortion curve when the light having the wavelength of 587.6 nm is projected in the wide angle photographic lens assembly in FIG. 5A. It can be observed from FIG. 5D that, the distortion ratio generated when the light having the wavelength of 587.6 nm is projected in the wide angle photographic lens assembly 50 is within a range of −100% to 0%. As shown in FIGS. 5B to 5D, the wide angle photographic lens assembly 50, designed according to the fourth embodiment, can balance the aberration correction and wide field of view.

The Sixth Embodiment

Embodiment 6

FIG. 6A is a schematic structural view of a sixth embodiment of a wide angle photographic lens assembly according to the present disclosure. The specific implementation is substantially the same as that in the first embodiment, and the elements in the sixth embodiment are the same as those in the first embodiment, so that the element symbols all begin with "6" as the hundredth digit, which represents that the elements have the same function or structure. For the sake of conciseness, only the differences are illustrated below, and the similar parts will not be repeated herein. In this embodiment, for example, the wavelength of the light received by the wide angle photographic lens assembly 60 is 587.6 nm, but the wavelength of the light received by the wide angle photographic lens assembly 60 may be adjusted according to actual requirements, and is not limited to the wavelength value mentioned above.

In this embodiment, the refractive power of a first lens element 610 is negative, and the first lens element 610 has a convex object-side surface 611 and a concave image-side surface 612. The refractive power of a second lens element 620 is positive, and the second lens element 620 has a concave object-side surface 621 and a convex image-side surface 622. The refractive power of a third lens element 630 is positive. The refractive power of a fourth lens element 640 is positive, and the fourth lens element 640 has a convex image-side surface 642. The refractive power of a fifth lens element 650 is negative, and the fifth lens element 650 has a concave object-side surface 651. The refractive power of a sixth lens element 660 is positive, the sixth lens element 660 has a convex image-side surface 662. Moreover, both the fourth lens element 640 and the sixth lens element 660 are bi-convex lens elements.

The detailed data of the wide angle photographic lens assembly 60 is as shown in Table 6-1 below.

TABLE 6-1

Embodiment 6
f = 1.40 mm, Fno = 2.05, HFOV = 90.1 deg.

| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 9.980 | 1.170 | Glass | 1.804 | 46.6 | −4.80 |
| 2 | | 2.638 | 2.030 | | | | |
| 3 | Lens 2 | −4.624600 (ASP) | 3.197 | Plastic | 1.634 | 23.8 | 9.11 |
| 4 | | −3.257200 (ASP) | 0.115 | | | | |
| 5 | Ape. Stop | plano | 0.239 | | | | |
| 6 | Lens 3 | −1.657660 (ASP) | 1.161 | Plastic | 1.535 | 56.3 | 19.37 |
| 7 | | −1.777510 (ASP) | 0.100 | | | | |
| 8 | Lens 4 | 2.844530 (ASP) | 1.443 | Plastic | 1.535 | 56.3 | 2.19 |

TABLE 6-1-continued

Embodiment 6
f = 1.40 mm, Fno = 2.05, HFOV = 90.1 deg.

| Surface # | | Curvature Radius | Thickness | Material | Index | Abbe # | Focal length |
|---|---|---|---|---|---|---|---|
| 9 | | −1.640710 (ASP) | 0.119 | | | | |
| 10 | Lens 5 | −1.237860 (ASP) | 0.549 | Plastic | 1.634 | 23.8 | −1.45 |
| 11 | | 4.149600 (ASP) | 0.100 | | | | |
| 12 | Lens 6 | 2.559980 (ASP) | 1.677 | Plastic | 1.535 | 56.3 | 2.62 |
| 13 | | −2.383030 (ASP) | 0.500 | | | | |
| 14 | IR-filter | plano | 0.300 | Glass | 1.516 | 64.1 | — |
| 15 | | plano | 0.500 | | | | |
| 16 | Cover-glass | plano | 0.400 | Glass | 1.516 | 64.1 | — |
| 17 | | plano | 0.393 | | | | |
| 18 | Image | plano | — | | | | |

Note:
Reference wavelength is d-line 587.6 nm

In addition, the first lens element 610 is spheric. The second lens element 620, the third lens element 630, the fourth lens element 640, the fifth lens element 650, and the sixth lens element 660 are aspheric, and the aspheric surfaces, for example, satisfy Condition ASP, but are not limited thereto. As for the parameters of the aspheric surfaces, reference is made to Table 6-2 below.

TABLE 6-2

Aspheric Coefficients

| Surface# | 3 | 4 | 6 | 7 | 8 |
|---|---|---|---|---|---|
| k | −1.27715E+01 | −2.50525E+01 | 9.45638E−01 | 4.42429E−01 | −4.97611E−01 |
| $A_4$ | −9.37027E−03 | −4.00877E−02 | 1.00420E−01 | −3.70307E−02 | −5.30149E−02 |
| $A_6$ | 1.97777E−03 | 6.16480E−02 | −1.75604E−01 | −2.56870E−02 | −1.58356E−02 |
| $A_8$ | −1.06818E−04 | −6.50013E−02 | 1.88498E−01 | 3.45556E−02 | 1.09255E−02 |
| $A_{10}$ | −7.57781E−06 | 2.15978E−02 | −1.58537E−01 | −1.19935E−02 | −1.83987E−03 |
| $A_{12}$ | −1.98011E−23 | −1.98011E−23 | −1.98011E−23 | −1.98011E−23 | −1.98011E−23 |

| Surface# | 9 | 10 | 11 | 12 | 13 |
|---|---|---|---|---|---|
| k | −5.61387E+00 | −1.91178E+00 | 2.50458E+00 | −9.09652E−01 | −6.07021E+00 |
| $A_4$ | −6.65608E−02 | 2.49823E−02 | 2.16554E−03 | −1.53511E−02 | −1.02703E−02 |
| $A_6$ | 2.28613E−03 | −3.02006E−03 | −1.97246E−03 | −9.24120E−03 | 3.85971E−03 |
| $A_8$ | 5.44174E−03 | −4.81285E−04 | −1.15787E−04 | 4.36190E−03 | −2.39172E−03 |
| $A_{10}$ | −9.82856E−04 | 2.24602E−04 | −1.87045E−04 | −5.54381E−04 | 4.46109E−04 |
| $A_{12}$ | −1.98011E−23 | −1.98011E−23 | — | — | −1.98011E−23 |

The content of Table 6-3 may be deduced from Table 6-1.

TABLE 6-3

Embodiment 6

| f (mm) | 1.40 | $f/f_6$ | 0.53 |
|---|---|---|---|
| Fno | 2.05 | $f/f_{12}$ | 0.03 |
| HFOV (deg.) | 90.10 | $Dr4S/T_{12}$ | 0.06 |
| $N_1$ | 1.80 | $T_{23}/CT_2$ | 0.11 |
| $V_6-V_5$ | 32.5 | $(R_7+R_8)/(R_7-R_8)$ | 0.27 |
| $f/f_1$ | −0.29 | $R_9/f$ | −0.88 |
| $f/f_2$ | 0.15 | $R_8/R_9$ | 1.33 |
| $f/f_3$ | 0.07 | ImgH/f | 1.44 |

FIG. 6B is a schematic view of longitudinal spherical aberration curves when the lights having a wavelength of 486.1 nm, 587.6 nm, and 656.3 nm are respectively projected in the wide angle photographic lens assembly 60 in FIG. 6A. It can be observed from FIG. 6B that, no matter the wavelength of the light received by the wide angle photographic lens assembly 60 of this embodiment is 486.1 nm, 587.6 nm, or 656.3 nm, the longitudinal spherical aberration generated by the wide angle photographic lens assembly 10 is within the range of −0.01 mm to 0.03 mm.

FIG. 6C is a schematic view of astigmatic field curves when the light having the wavelength of 587.6 nm is projected in the wide angle photographic lens assembly 60 in FIG. 6A. It can be observed from FIG. 6C that, when the light having the wavelength of 587.6 nm is projected in the wide angle photographic lens assembly 60, the astigmatic field curvature of the tangential plane is within a range of −0.03 mm to 0.07 mm, and the astigmatic field curvature of the sagittal plane is within a range of −0.03 mm to 0.03 mm.

FIG. 6D is a schematic view of a distortion curve when the light having the wavelength of 587.6 nm is projected in the wide angle photographic lens assembly 60 in FIG. 6A. It can be observed from FIG. 6D that, the distortion ratio generated when the light having the wavelength of 587.6 nm is projected in the wide angle photographic lens assembly 40 is within a range of −100% to 0%. As shown in FIGS. 6B to 6D, the wide angle photographic lens assembly 60, designed according to the sixth embodiment, can balance the aberration correction and wide field of view.

The Seventh Embodiment

Embodiment 7

FIG. 7A is a schematic structural view of a seventh embodiment of a wide angle photographic lens assembly according to the present disclosure. The specific implementation is substantially the same as that in the first embodiment, and the elements in the seventh embodiment are the same as those in the first embodiment, so that the element symbols all begin with "7" as the hundredth digit, which represents that the elements have the same function or structure. For the sake of conciseness, only the differences are illustrated below, and the similar parts will not be repeated herein.

In this embodiment, for example, the wavelength of the light received by the wide angle photographic lens assembly 70 is 587.6 nm, but the wavelength of the light received by the wide angle photographic lens assembly 70 may be adjusted according to actual requirements, and is not limited to the wavelength value mentioned above.

In this embodiment, the refractive power of a first lens element 710 is negative, and the first lens element 710 has a convex object-side surface 711 and a concave image-side surface 712. The refractive power of a second lens element 720 is positive, and the second lens element 720 has a concave object-side surface 721 and a convex image-side surface 722. The refractive power of a third lens element 730 is negative. The refractive power of a fourth lens element 740 is positive, and the fourth lens element 740 has a convex image-side surface 742. The refractive power of a fifth lens element 750 is negative, the fifth lens element 750 has a concave object-side surface 751. The refractive power of a sixth lens element 760 is positive, and the sixth lens element 760 has a convex image-side surface 762. Moreover, both the fourth lens element 740 and the sixth lens element 760 are bi-convex.

The detailed data of the wide angle photographic lens assembly 70 is as shown in Table 7-1 below.

In addition, the first lens element 710, the second lens element 720, the third lens element 730, the fourth lens element 740, the fifth lens element 750, and the sixth lens element 760 are aspheric, and the aspheric surfaces, for example, satisfy Condition ASP, but are not limited thereto. As for the parameters of the aspheric surfaces, reference is made to Table 7-2 below.

TABLE 7-2

| Aspheric Coefficients | | | | |
|---|---|---|---|---|
| Surface # | 1 | 2 | 3 | 4 |
| k | −2.92170E+00 | −5.46256E−01 | −3.04097E+00 | −1.37485E+01 |
| $A_4$ | 2.46771E−05 | −1.08000E−02 | −1.42177E−02 | 4.26228E−02 |
| $A_6$ | −8.03988E−06 | 1.91395E−03 | 6.55941E−03 | 2.68819E−02 |
| $A_8$ | −6.32509E−08 | −4.31587E−04 | −6.49959E−04 | −5.52174E−02 |
| $A_{10}$ | 3.67439E−09 | −2.09696E−05 | −9.37860E−05 | 2.35564E−02 |
| $A_{12}$ | — | — | −2.98794E−15 | −2.96919E−15 |

| Surface # | 6 | 7 | 8 | 9 |
|---|---|---|---|---|
| k | −8.00000E+01 | −1.63474E+01 | −1.09066E+01 | −1.05581E+00 |
| $A_4$ | 3.15418E−01 | −1.53147E−01 | −1.12253E−01 | −5.97531E−02 |
| $A_6$ | −2.15631E−01 | 1.04277E−01 | −6.71426E−02 | −5.12557E−02 |
| $A_8$ | 1.91340E−01 | 1.03488E−02 | −1.50288E−01 | 7.30175E−02 |
| $A_{10}$ | −8.97827E−02 | 4.04185E−02 | −1.39712E−01 | −7.61053E−02 |
| $A_{12}$ | −2.96919E−15 | −2.96919E−15 | −2.96919E−15 | −2.96919E−15 |

| Surface # | 10 | 11 | 12 | 13 |
|---|---|---|---|---|
| k | −1.84531E+00 | 1.00000E+02 | −2.00841E+01 | −6.94258E+00 |
| $A_4$ | −8.58087E−02 | 4.69715E−02 | 5.22071E−03 | −8.12271E−02 |
| $A_6$ | 5.39630E−02 | 2.26530E−02 | −1.18257E−02 | 4.54733E−02 |
| $A_8$ | 7.44839E−02 | −1.41625E−02 | 6.20104E−03 | −1.86616E−02 |
| $A_{10}$ | −3.76498E−02 | −2.04317E−04 | −8.36554E−04 | 2.84378E−03 |
| $A_{12}$ | −2.96919E−15 | — | — | −2.96919E−15 |

TABLE 7-1

| Embodiment 7 | | | | | | |
|---|---|---|---|---|---|---|
| f = 1.13 mm, Fno = 2.40, HFOV = 83.8 deg. | | | | | | |
| Surface # | | Curvature Radius | Thickness | Material | Index | Abbe # | Focal length |
|---|---|---|---|---|---|---|---|
| 0 | Object | plano | Infinity | | | | |
| 1 | Lens 1 | 10.328100 (ASP) | 1.333 | Plastic | 1.530 | 55.8 | −3.03 |
| 2 | | 1.327360 (ASP) | 2.790 | | | | |
| 3 | Lens 2 | −6.156700 (ASP) | 2.600 | Plastic | 1.634 | 23.8 | 2.80 |
| 4 | | −1.601770 (ASP) | 0.100 | | | | |
| 5 | Ape. Stop | plano | −0.001 | | | | |
| 6 | Lens 3 | 38.887900 (ASP) | 0.450 | Plastic | 1.544 | 55.9 | −2.46 |
| 7 | | 1.289170 (ASP) | 0.110 | | | | |
| 8 | Lens 4 | 1.279750 (ASP) | 1.127 | Plastic | 1.530 | 55.8 | 1.25 |
| 9 | | −0.951670 (ASP) | 0.116 | | | | |
| 10 | Lens 5 | −0.704110 (ASP) | 0.300 | Plastic | 1.634 | 23.8 | −1.05 |
| 11 | | 14.318800 (ASP) | 0.182 | | | | |
| 12 | Lens 6 | 2.248490 (ASP) | 1.417 | Plastic | 1.544 | 55.9 | 2.07 |
| 13 | | −1.763150 (ASP) | 0.500 | | | | |
| 14 | IR-filter | plano | 0.300 | Glass | 1.516 | 64.1 | — |
| 15 | | plano | 0.500 | | | | |
| 16 | Cover-glass | plano | 0.400 | Glass | 1.516 | 64.1 | — |
| 17 | | plano | 0.229 | | | | |
| 18 | Image | plano | — | | | | |

Note:
Reference wavelength is d-line 587.6 nm

The content of Table 7-3 may be deduced from Table 7-1.

TABLE 7-3

| Embodiment 7 | | | |
|---|---|---|---|
| f (mm) | 1.13 | $f/f_6$ | 0.54 |
| Fno | 2.40 | $f/f_{12}$ | 0.62 |
| HFOV (deg.) | 83.80 | $Dr4S/T_{12}$ | 0.04 |
| $N_1$ | 1.53 | $T_{23}/CT_2$ | 0.04 |
| $V_6-V_5$ | 32.1 | $(R_7+R_8)/(R_7-R_8)$ | 0.15 |
| $f/f_1$ | −0.37 | $R_9/f$ | −0.63 |
| $f/f_2$ | 0.40 | $R_8/R_9$ | 1.35 |
| $f/f_3$ | −0.46 | ImgH/f | 1.85 |

FIG. 7B is a schematic view of longitudinal spherical aberration curves when the lights having wavelengths of 486.1 nm, 587.6 nm, and 656.3 nm are respectively projected in the wide angle photographic lens assembly 70 in FIG. 7A. It can be observed from FIG. 7B that, no matter the wavelength of the light received by the wide angle photographic lens assembly 70 of this embodiment is 486.1 nm, 587.6 nm, or 656.3 nm, the longitudinal spherical aberration generated by the wide angle photographic lens assembly 10 is within the range of −0.03 mm to 0.02 mm.

FIG. 7C is a schematic view of astigmatic field curves when the light having the wavelength of 587.6 nm is projected in the wide angle photographic lens assembly 70 in FIG. 7A. It can be observed from FIG. 7C that, when the light having the wavelength of 587.6 nm is projected in the wide angle photographic lens assembly 70, the astigmatic field curvature of the tangential plane is within a range of 0.0 mm to 0.08 mm, and the astigmatic field curvature of the sagittal plane is within a range of −0.01 mm to 0.08 mm.

FIG. 7D is a schematic view of a distortion curve when the light having the wavelength of 587.6 nm is projected in the wide angle photographic lens assembly 70 in FIG. 7A. It can be observed from FIG. 7D that, the distortion ratio generated when the light having the wavelength of 587.6 nm is projected in the wide angle photographic lens assembly 70 is within a range of −80% to 0%. As shown in FIGS. 7B to 7D, the wide angle photographic lens assembly 70, designed according to the seventh embodiment, can balance the aberration correction and wide field of view.

What is claimed is:

1. An wide angle photographic lens assembly, comprising, in order from an object side to an image side:
   a first lens element with negative refractive power having a convex object-side surface and a concave image-side surface;
   a second lens element with positive refractive power having a concave object-side and a convex image-side surface;
   a third lens element;
   a fourth lens element with positive refractive power;
   a fifth lens element with negative refractive power; and
   a sixth lens element with positive refractive power;
   wherein a focal length of the wide angle photographic lens assembly is f, a focal length of the second lens element is $f_2$, and a focal length of the sixth lens element is $f_6$, and following conditions are satisfied:

$0 < f/f_2 < 1.0$; and $0.35 < f/f_6 < 0.95$.

2. The wide angle photographic lens assembly according to claim 1, wherein the image-side surface of the sixth lens element is convex.

3. The wide angle photographic lens assembly according to claim 2, wherein the image-side surface of the fourth lens element is convex, and the object-side surface of the fifth lens element is concave.

4. The wide angle photographic lens assembly according to claim 3, wherein an axial distance between the first lens element and the second lens element is $T_{12}$, an axial distance between the image-side surface of the second lens element and a stop of the wide angle photographic lens assembly is Dr4S, and the wide angle photographic lens assembly satisfies the following condition: $Dr4S/T_{12} < 0.4$.

5. The wide angle photographic lens assembly according to claim 3, wherein an axial distance between the second lens element and the third lens element is $T_{23}$, a thickness of the second lens element near the optical axis is $CT_2$, and the wide angle photographic lens assembly satisfies the following condition: $T_{23}/CT_2 < 0.4$.

6. The wide angle photographic lens assembly according to claim 5, wherein the wide angle photographic lens assembly further satisfies the following condition:

$T_{23}/CT_2 < 0.2$.

7. The wide angle photographic lens assembly according to claim 4, wherein a focal length of the third lens element is $f_3$, and the wide angle photographic lens assembly satisfy the following condition: $-1.3 < f/f_3 < 0.2$.

8. The wide angle photographic lens assembly according to claim 4, wherein a curvature radius of the image-side surface of the fourth lens element is $R_8$, a curvature radius of the object-side surface of the fifth lens element is $R_9$, and the wide angle photographic lens assembly satisfies the following condition: $0.9 < R_8/R_9 < 1.7$.

9. The wide angle photographic lens assembly according to claim 5, wherein a focal length of the sixth lens element is $f_6$, and the wide angle photographic lens assembly satisfies the following condition: $0.4 < f/f_6 < 0.7$.

10. The wide angle photographic lens assembly according to claim 5, wherein an axial distance between the first lens element and the second lens element is $T_{12}$, an axial distance between the image-side surface of the second lens element and the stop is Dr4S, and the wide angle photographic lens assembly satisfies the following condition:

$Dr4S/T_{12} < 0.2$.

11. The wide angle photographic lens assembly according to claim 7, wherein the wide angle photographic lens assembly further satisfies the following condition:

$-1.0 < f/f_3 < 0$.

12. The wide angle photographic lens assembly according to claim 7, wherein a curvature radius of the object-side surface of the fifth lens element is $R_9$, and the wide angle photographic lens assembly satisfies the following condition: $-1.0 < R_9/f < -0.4$.

13. The wide angle photographic lens assembly according to claim 7, wherein a curvature radius of the object-side surface of the fourth lens element is $R_7$, a curvature radius of the image-side surface of the fourth lens element is $R_8$, and the wide angle photographic lens assembly satisfies the following condition: $0 \leq (R_7+R_8)/(R_7-R_8) \leq 1.0$.

14. The wide angle photographic lens assembly according to claim 7, wherein a refractive index of the first lens element is $N_1$, and the wide angle photographic lens assembly satisfies the following condition: $N_1 > 1.72$.

15. The wide angle photographic lens assembly according to claim 11, wherein a focal length of the first lens element is $f_1$, and the wide angle photographic lens assembly satisfies the following condition: $-0.4 < f/f_1 < -0.1$.

16. The wide angle photographic lens assembly according to claim 3, wherein an Abbe number of the fifth lens element is $V_5$, an Abbe number of the sixth lens element is $V_6$, and the wide angle photographic lens assembly satisfies the following condition:

$28 < V_6 - V_5 < 45$.

17. The wide angle photographic lens assembly according to claim 2, wherein the wide angle photographic lens assembly further comprises an image sensor, half of the diagonal length of the effective photosensitive area of the sensor is ImgH, and the wide angle photographic lens assembly satisfies the following condition: ImgH/f>1.2.

18. The wide angle photographic lens assembly according to claim 17, wherein half of a maximal viewing angle in the wide angle photographic lens assembly is HFOV, and the wide angle photographic lens assembly satisfies the following condition: HFOV>75.

19. An wide angle photographic lens assembly, comprising, in order from an object side to an image side:
 a front lens group with positive refractive power, comprising:
  a first lens element with negative refractive power having a convex object-side surface and a concave image-side surface; and
  a second lens element with positive refractive power having a concave object-side surface and a convex image-side surface;
 a stop; and
 a rear lens group, comprising:
  a third lens element;
  a fourth lens element with positive refractive power;
  a fifth lens element with negative refractive power; and
  a sixth lens element with positive refractive power;
 wherein an axial distance between the first lens element and the second lens element is $T_{12}$, an axial distance between the image-side surface of the second lens element and the stop is Dr4S, a focal length of the wide angle photographic lens assembly is f, an overall focal length of the front lens group is $f_{12}$, and following conditions are satisfied:

$Dr4S/T_{12} < 0.4$; and $0 < f/f_{12} < 1.2$.

20. The wide angle photographic lens assembly according to claim 19, wherein there is at least one bi-convex lens element with positive refractive power in the rear lens group.

21. The wide angle photographic lens assembly according to claim 20, wherein the image-side surface of the fourth lens element is convex, the object-side surface of the fifth lens element is concave, and the image-side surface of the sixth lens element is convex.

22. The wide angle photographic lens assembly according to claim 21, wherein an axial distance between the second lens element and the third lens element is $T_{23}$, a thickness of the second lens element near the optical axis is $CT_2$, and the wide angle photographic lens assembly satisfies the following condition: $T_{23}/CT_2 < 0.2$.

23. The wide angle photographic lens assembly according to claim 21, wherein the wide angle photographic lens assembly further comprises an image sensor, half of the diagonal length of the effective photosensitive area of the sensor is ImgH, and the wide angle photographic lens assembly satisfies the following condition: ImgH/f>1.2.

24. The wide angle photographic lens assembly according to claim 21, wherein an Abbe number of the fifth lens element is $V_5$, an Abbe number of the sixth lens element is $V_6$, and the wide angle photographic lens assembly satisfies the following condition:

$28 < V_6 - V_5 < 45$.

25. The wide angle photographic lens assembly according to claim 21, a focal length of the third lens element is $f_3$, and the wide angle photographic lens assembly satisfies the following condition: $-1.0 < f/f_3 < 0$.

* * * * *